(12) United States Patent
Kobayashi et al.

(10) Patent No.: US 8,363,530 B2
(45) Date of Patent: Jan. 29, 2013

(54) INFORMATION REPRODUCTION METHOD, INFORMATION RECORDING METHOD, AND INFORMATION RECORDING MEDIUM

(75) Inventors: Isao Kobayashi, Osaka (JP); Harumitsu Miyashita, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/378,862

(22) PCT Filed: Apr. 12, 2011

(86) PCT No.: PCT/JP2011/002156
§ 371 (c)(1),
(2), (4) Date: Dec. 16, 2011

(87) PCT Pub. No.: WO2011/132381
PCT Pub. Date: Oct. 27, 2011

(65) Prior Publication Data
US 2012/0092974 A1   Apr. 19, 2012

(30) Foreign Application Priority Data

Apr. 20, 2010  (JP) .................................. 2010-096788

(51) Int. Cl.
*G11B 7/00* (2006.01)
(52) U.S. Cl. .................................. 369/59.12; 369/59.22
(58) Field of Classification Search ............... 369/59.22, 369/59.11, 59.12, 59.13, 59.24, 59.25, 59.17, 369/59.18, 59.19, 124.05; 375/341, 229; 375/362; 714/794
See application file for complete search history.

(56) References Cited

U.S. PATENT DOCUMENTS

| 7,385,900 | B2 * | 6/2008 | Tonami ..................... 369/59.22 |
| 2003/0090980 | A1 | 5/2003 | Kashihara et al. |
| 2005/0078579 | A1 | 4/2005 | Miyashita et al. |
| 2005/0249318 | A1 | 11/2005 | Minemura |
| 2010/0188953 | A1 | 7/2010 | Imai |
| 2010/0284257 | A1 | 11/2010 | Nakamura et al. |

FOREIGN PATENT DOCUMENTS

| EP | 2 051 256 A1 | 4/2009 |
| JP | 2003-151219 A | 5/2003 |
| JP | 2004-335079 A | 11/2004 |
| JP | 3697409 B | 7/2005 |
| JP | 2005-346897 A | 12/2005 |
| JP | 2007-280492 A | 10/2007 |
| JP | 2008-047181 A | 2/2008 |
| JP | 2010-262702 A | 11/2010 |

OTHER PUBLICATIONS

International Search Report for corresponding International Application No. PCT/JP2011/002156 mailed May 17, 2011.

* cited by examiner

*Primary Examiner* — Nabil Hindi
(74) *Attorney, Agent, or Firm* — Renner, Otto, Boisselle & Sklar, LLP

(57) ABSTRACT

According to the present invention, a first error pattern caused by a shift of a bit relating to a recording mark or a space of a shortest length and a second error pattern caused by an edge shift of the recording mark are used. For each of a plurality of error patterns, a pattern shift obtained by normalizing a difference between a square of a Euclidean distance between the error pattern and a reproduction signal and a square of a Euclidean distance between a correct pattern and the reproduction signal, using a square of a Euclidean distance between the correct pattern and the error pattern is detected. Length and phase errors are calculated by a sum of, or a difference between, a first pattern shift amount obtained by normalization performed using the first error pattern and a second pattern shift amount obtained by normalization performed using the second error pattern.

10 Claims, 14 Drawing Sheets

FIG.6
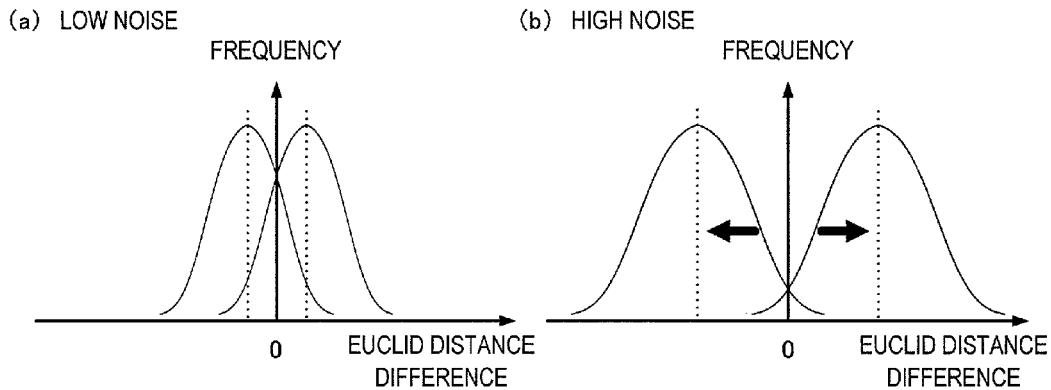
(a) LOW NOISE
(b) HIGH NOISE
FIG.7
(a)
| LEADING EDGE | | RECORDING MARK M(i) | | | |
|---|---|---|---|---|---|
| | | 2Tm | 3Tm | 4Tm | ≧5Tm |
| PREVIOUS SPACE S(i-1) | 2Ts | 2Ts2Tm | 2Ts3Tm | 2Ts4Tm | 2Ts5Tm |
| | 3Ts | 3Ts2Tm | 3Ts3Tm | 3Ts4Tm | 3Ts5Tm |
| | 4Ts | 4Ts2Tm | 4Ts3Tm | 4Ts4Tm | 4Ts5Tm |
| | ≧5Ts | 5Ts2Tm | 5Ts3Tm | 5Ts4Tm | 5Ts5Tm |
(b)
| TRAILING EDGE | | RECORDING MARK M(i) | | | |
|---|---|---|---|---|---|
| | | 2Tm | 3Tm | 4Tm | ≧5Tm |
| SUBSEQUENT SPACE S(i+1) | 2Ts | 2Tm2Ts | 3Tm2Ts | 4Tm2Ts | 5Tm2Ts |
| | 3Ts | 2Tm3Ts | 3Tm3Ts | 4Tm3Ts | 5Tm3Ts |
| | 4Ts | 2Tm4Ts | 3Tm4Ts | 4Tm4Ts | 5Tm4Ts |
| | ≧5Ts | 2Tm5Ts | 3Tm5Ts | 4Tm5Ts | 5Tm5Ts |
FIG.8
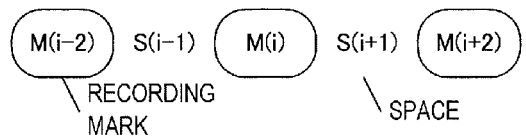

| RECORDING MARK M(i) | 2Tm | | 3Tm | 4Tm | ≥5Tm |
|---|---|---|---|---|---|
| S(i−1) \ S(i+1) | 2Ts | !2Ts | xTs | | |
| 2Ts | 2Ts2Tm2Ts | 2Ts2Tm!2Ts | (2Ts3Tm) | (2Ts4Tm) | (2Ts5Tm) |
| 3Ts | 3Ts2Tm2Ts | 3Ts2Tm!2Ts | (3Ts3Tm) | (3Ts4Tm) | (3Ts5Tm) |
| 4Ts | 4Ts2Tm2Ts | 4Ts2Tm!2Ts | (4Ts3Tm) | (4Ts4Tm) | (4Ts5Tm) |
| ≥5Ts | 5Ts2Tm2Ts | 5Ts2Tm!2Ts | (5Ts3Tm) | (5Ts4Tm) | (5Ts5Tm) |

SMS GROUP — 2Tm/2Ts column; SM GROUP — 2Tm/!2Ts column; MS GROUP — ≥5Ts row (b)

| RECORDING MARK M(i) | 2Tm | | 3Tm | 4Tm | ≥5Tm |
|---|---|---|---|---|---|
| S(i+1) \ S(i−1) | 2Ts | !2Ts | xTs | | |
| 2Ts | 2Ts2Tm2Ts | !2Ts2Tm2Ts | (3Tm2Ts) | (4Tm2Ts) | (5Tm2Ts) |
| 3Ts | 2Ts2Tm3Ts | !2Ts2Tm3Ts | (3Tm3Ts) | (4Tm3Ts) | (5Tm3Ts) |
| 4Ts | 2Ts2Tm4Ts | !2Ts2Tm4Ts | (3Tm4Ts) | (4Tm4Ts) | (5Tm4Ts) |
| ≥5Ts | 2Ts2Tm5Ts | !2Ts2Tm5Ts | (3Tm5Ts) | (4Tm5Ts) | (5Tm5Ts) |

SMS GROUP — 2Tm/2Ts column; MS GROUP — 2Tm/!2Ts column; SM GROUP — ≥5Ts row

FIG.10

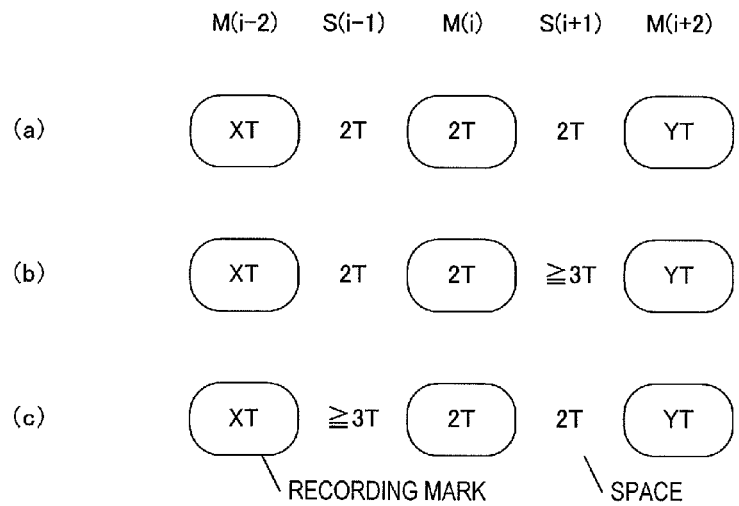

FIG.21
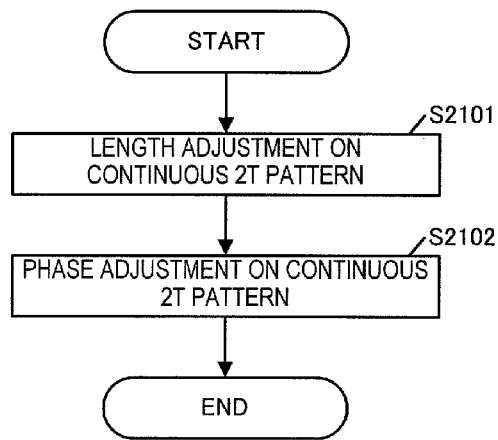
FIG.22
(a)
|  | SM PATTERN | |
|---|---|---|
|  | LENGTH CHANGE | PHASE CHANGE |
| PXM2S | 0.5 | 0.5 |
| P2MXS | -3.8 | 1.8 |
| ASM_R | 1.6 | 2.3 |
| ASM_L | -2.3 | -0.2 |
| BSM_R | -1.5 | 0.9 |
| BSM_L | 2.2 | -1.4 |
(b)
|  | MS PATTERN | |
|---|---|---|
|  | LENGTH CHANGE | PHASE CHANGE |
| P2SXM | 0.6 | -0.6 |
| PXS2M | -3.9 | -1.6 |
| AMS_R | -2.3 | 0.2 |
| AMS_L | 1.7 | -2.4 |
| BMS_R | 2.3 | 1.1 |
| BMS_L | -1.5 | -0.7 |
FIG.23
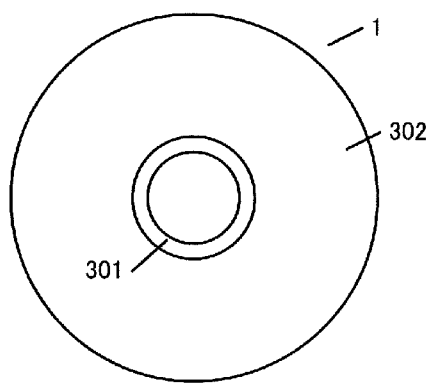

INFORMATION REPRODUCTION METHOD, INFORMATION RECORDING METHOD, AND INFORMATION RECORDING MEDIUM

TECHNICAL FIELD

The present invention relates to an information reading method and an information recording method for more stably realizing high density recording performed using an information recording medium having an information recording face on which information can be optically recorded, and an information recording medium for storing a recording condition adjusted by such a method.

BACKGROUND ART

Optical discs such as DVDs (Digital Versatile Discs), BDs (Blu-ray Discs) and the like are used as recording mediums for storing video or data and are required to realize higher density recording.

On such an optical disc, information is recorded by forming recording marks and spaces on a recording layer. In order to perform higher density recording on the optical disc, the recording marks and spaces need to be shortened.

However, as the recording density on the optical disc is increased, the increase of inter-code interference and the deterioration of the SNR (Signal Noise Ratio) become more conspicuous. When the recording marks and spaces are shortened, the amplitude of the reproduction signals is decreased and also there occurs a difference in the amplitude of the reproduction signals in accordance with the combination of the recording marks and spaces by the influence of the inter-code interference. For example, even when recording marks have the same length, the reproduction signals detected especially at edges of the recording marks have different amplitudes due to the difference in the length of the spaces before and after the recording marks. In such a situation, it is considered to be effective to use a PRML (Partial Response Maximum Likelihood) method or the like as the reproduction signal processing method.

In high density recording, as the spaces are shortened, the influence of thermal interference by the recording marks before and after the spaces is increased. Due to the influence of the thermal interference, the position of the edge of the recording mark to be formed is changed. In order to form a recording mark having an appropriate edge position, the pulse waveform of the recording laser light provided in accordance with the length of the space needs to be fine-tuned (recording compensated).

Now, the pulse waveform of the recording laser will be described briefly. FIG. 2 illustrates a recording pulse waveform and a recording power.

FIG. 2(a) shows a cycle Tw of a channel clock, which acts as a reference signal for generating recording data. Based on the cycle Tw, the time interval of the recording marks and spaces of an NRZI (Non Return to Zero Inverting) signal, which is a recording signal shown in FIG. 2(b), is determined. In FIG. 2(b), a recording pattern of 2T mark-2T space-4T mark is shown as an example of a part of the NRZI signal.

FIG. 2(c) shows a multi-pulse train of laser light for forming recording marks. A recording power Pw of the multi-pulse train includes a peak power Pp201 having a heating effect, which is required to form recording marks; a bottom power Pb202 and a cooling power Pc203 both having a cooling effect; and a space power Ps204, which is a recording power in a space. The peak power Pp201, the bottom power Pb202, the cooling power Pc203 and the space power Ps204 are set using an extinction level 205 detected when the laser light is extinguished as a reference level.

The bottom power Pb202 and the cooling power Pc203 are set to an equivalent level of recording power, but the cooling power Pc203 may be occasionally set to a different level from that of the bottom power Pb202 in order to adjust the heat amount at a trailing end of a recording mark. Since no recording mark needs to be formed in a space, the space power Ps204 is generally set to a lower level of recording power (for example, a level equivalent to that of a reproduction power, the bottom power or the like). However, in the case of a rewritable optical disc (for example, a DVD-RAM or a BD-RE), a space needs to be formed by erasing the existing recording mark. Therefore, the space power Ps204 may be occasionally set to a relatively high level of recording power. Also in the case of a write-once optical disc (for example, a DVD-R or a BD-R), the space power Ps204 may be occasionally set to a relatively high level of recording power in order to provide a pre-heating power for forming the next recording mark. Even in such a case, the space power Ps204 is not set to a higher level than that of the peak power Pp201.

The pulse widths are set as follows. A leading pulse width Ttop is set for each of 2T, 3T and 4T or longer recording signals. The pulse widths after Ttop which are present in 3T or longer multi-pulse trains are set to be equal at Tmp. The final pulse width Tmp is set as a last pulse width Tlp. For each recording mark length, a recording start position offset dTtop for adjusting a start position of the recording mark and a recording termination position offset dTs for adjusting an end position of the recording mark are set. The "recording compensation" (space compensation) means changing a recording parameter (for example, dTtop) of a recording pulse in accordance with the length of the space before or after the recording mark.

Laser emission conditions for recording which include the value of each recording power and the value of each pulse width of the multi-pulse trains are described inside the optical disc. Accordingly, as long as the recording powers and the pulse widths of the multi-pulse trains described inside the optical disc can be reproduced and the recording layer of the optical disc can be irradiated with laser light, the recording marks as shown in FIG. 2(d) can be formed.

The recording pulse waveform may be the multi-pulse waveform shown in FIG. 2(c) or any of the waveforms shown in FIG. 3. FIG. 3(a) shows a mono-pulse waveform, FIG. 3(b) shows an L-type pulse waveform, and FIG. 3(c) shows a Castle-type pulse waveform. The recording pulse waveforms are different in the heat amount accumulated in the recording layer of the optical disc, and a recording pulse waveform suitable to the layer characteristics of the recording layer is selected in order to form an optimum recording mark.

An example of recording control method of processing a reproduction signal by the PRML method to perform recording compensation is disclosed in Patent Document No. 1 and Patent Document No. 2.

In Patent Document No. 1, a first bit sequence (state transition matrix having the maximum likelihood), which is a demodulation result, and a second bit sequence (state transition matrix having the second maximum likelihood), which is shifted by 1 bit from the first bit sequence, are used to calculate a Euclidean distance Pa between the reproduction signal and the first bit sequence and a Euclidean distance Pb between the reproduction signal and the second bit sequence, respectively. In addition, an edge shift direction and an edge shift amount of each pattern are detected based on an average value of the calculated |Pa−Pb|−Pstd, where Pstd is the Euclidean distance between the first bit sequence and the second bit sequence. As a result, the adaptive recording parameters, provided in the form of a table based on the lengths of a space and a mark continuous to each other, are optimized in accordance with the edge shift direction and amount corresponding to each pattern.

In Patent Document No. 2, a first pattern (state transition matrix having the maximum likelihood), which is a demodulation result, and a second pattern and a third pattern, which are error patterns with respect to the first pattern are set. Each of the second pattern and the third pattern may be any pattern which becomes an error pattern when the edge to be detected is shifted rightward or leftward with respect to the first pattern. A Euclidean distance E1 between the reproduction signal and the first pattern, a Euclidean distance E2 between the reproduction signal and the second pattern, and a Euclidean distance E3 between the reproduction signal and the third pattern are each calculated. In addition, based on distance difference D2=E2−E1 and distance difference D3=E3−E1, an average value M2 and a standard deviation σ2 of D2 and an average value M3 and a standard deviation σ3 of D3 are found. Then, a correction amount on the recording pulse is determined from the expression Ec=(σ2*M3+σ3*M2)/(σ2+σ3).

CITATION LIST

Patent Literature

Patent Document No. 1: Japanese Patent Application Laid-Open Publication No. 2004-335079

Patent Document No. 2: Japanese Patent No. 3697409

SUMMARY OF INVENTION

Technical Problem

As the recording density on an information recording medium is further increased, the problems of the inter-code interference and the deterioration of the SNR become more serious.

Especially, when the recording density exceeds the optical resolution, a reproduction signal obtained from a signal of continuous mark/space sequence of a shortest run length, namely, a reproduction signal obtained from a signal in which a recording mark and a space of the shortest run length are repeated, has an amplitude of zero. The condition under which "the recording density exceeds the optical resolution" is the condition under which length L of a recording mark and a space is λ/(4×NA) or less where λ is the wavelength of the laser light and NA is the numerical aperture of the objective lens. In the case of, for example, a BD system, λ=405 nm and NA=0.85 in general. Therefore, length L is about 119.1 nm. Assuming that the disc structure is the same, this corresponds to a recording capacity of about 31 GB. Accordingly, at high density recording at which the recording capacity is about 31 GB, the amplitude of a reproduction signal obtained from a signal of continuous mark/space sequence of the shortest run length is zero.

When the recording density exceeds the optical resolution, in the signal corresponding to the reproduction signal having an amplitude of zero, the edge of the recording mark does not appear. Therefore, a recording control method by the PRML method is necessary.

When high density recording is performed with the disc structure and the optical conditions being the same as described above, the lengths of the recording marks and spaces need to be shortened.

FIG. 4 illustrates a change of the shape of a recording mark, which differs by the recording density.

FIG. 4(a) shows a recording mark recorded at a low recording density, and FIG. 4(b) shows a recording mark recorded at a high recording density. The difference in the recording density is shown as the difference in the recording mark length.

In the case where the recording density is low as in FIG. 4(a), when the start end of the recording pulse is changed, the leading edge of the recording mark is changed.

By contrast, in the case where the recording density is high as in FIG. 4(b), when the start end of the recording pulse is changed, both of the leading edge and the trailing edge of the recording mark are changed. A reason for this is that while the recording mark is formed, the change in the heat at the start end influences the trailing end. Namely, an influence of the thermal interference during the formation of the recording mark of interest itself occurs.

Also in the case of a BD having a recording density corresponding to 25 GB, when a recording mark of the shortest length is formed, thermal interference of the recording mark of interest itself as shown in FIG. 4(b) occurs, to be precise. However, because the recording density does not exceed the optical resolution, the influence of the thermal interference of the recording mark of interest itself is insignificant. In actuality, recording adjustment is performed with recording conditions being set separately for the start end and for the trailing end. When the recording density is close to, or exceeds, the optical resolution, the influence of the thermal interference of the recording mark of interest itself is not ignorable.

Therefore, for a recording mark of the shortest length at high density recording (for example, corresponding to 30 GB or greater), it is preferable that as shown in FIG. 7, the recording condition is set in accordance with the space before or after the recording mark. It should be noted that in the case of still higher density recording (for example, corresponding to 40 GB or greater), a recording mark of the second shortest length is also a target of such setting in addition to a recording mark of the shortest length.

As described above, for high density recording, it is very difficult to form recording marks and spaces, especially recording marks and spaces of the shortest length, with an appropriate length. A high level of adjusting precision is required.

Now, bit error regarding a BD will be described.

The shortest run length of a modulation code for a BD is 2T. Errors are dominantly on the shortest recording marks and spaces, i.e., the 2T recording marks and spaces of a signal.

In the case of a BD having a recording density corresponding to 25 GB, there are many 1-bit errors, which are caused by an edge shift of recording marks. Therefore, as described in Patent Document No. 1, recording adjustment is performed on 1-bit errors.

However, when high density recording (corresponding to about 31 GB) exceeding the optical resolution is performed by a BD system, 2-bit errors, 3-bit errors and the like are also caused in addition to 1-bit errors.

Here, a "2-bit error" is an error by which a recording mark or space of the shortest length, i.e., 2T, is decoded as being shifted by 1T. For example, when the correct pattern is XT space-2T mark-YT space (Xs2mYs), the decoding result is erroneously (X−1)s2m(Y+1)s or (X+1)s2m(Y−1)s. When the correct pattern includes 2T space (Xm2sYm), the decoding result is erroneous in substantially the same manner.

X and Y may each be any positive integer and are each determined by a modulation code. For example, with the RLL(1,7) code, X and Y are 2T to 8T (there is 9T in the Sync part). Therefore, X and Y in (X−1) and (Y−1) are inevitably 3T or greater.

A 3-bit error is an error by which a continuous sequence of a recording mark and a space each of the shortest length, i.e., 2T, is decoded as being shifted by 1T. For example, when the correct pattern is XT mark-2T space-2T mark-YT space (Xm2s2mYs), the decoding result is erroneously (X−1)m2s2m(Y+1)s or (X+1)m2s2m(Y−1)s. When the correct pattern includes 2T mark-2T space (Xs2m2sYm), the decoding result is erroneous in substantially the same manner. In the case of high density recording, the influence of such a 3-bit error is significant.

Therefore, the recording adjustment on 1-bit errors described in Patent Document No. 1 is insufficient. In addition, in Patent Document No. 1, an edge of a continuous sequence of 2T mark and 2T space is not detected.

In Patent Document No. 2, an error pattern in which a detection edge corresponding to an edge to be subjected to recording adjustment is shifted rightward and leftward is set. Therefore, Patent Document No. 2 describes edge detection corresponding to a 2-bit error in addition to a 1-bit error.

FIG. 5 shows pattern distributions of Euclidean distance differences for a 1-bit error. FIG. 5(a) shows a pattern distribution when the reproduction noise is low. Since the noise is low, the pattern distribution does not expand much. When the reproduction noise is high as shown in FIG. 5(b), the pattern distribution expands widely. Nonetheless, the average value of the pattern distribution in FIG. 5(b) is not much different from the average value of the pattern distribution in FIG. 5(a).

A "Euclidean distance difference" represents a square of a Euclidean distance between an error pattern and each of signal S1 and signal S2. Euclidean distance difference D is calculated by the following expression.

$$D(S1, S2) = \sum_{k} (S1 - S2)^2 \qquad \text{(expression 1)}$$

FIG. 6 shows pattern distributions of Euclidean distance differences for a 2-bit error. FIG. 6(a) shows a pattern distribution when the reproduction noise is low, and is the same as FIG. 5(a). When the reproduction noise is high as shown in FIG. 6(b), the pattern distribution expands widely as in FIG. 5(b). The average value of the pattern distribution in FIG. 6(b) is different from the average value of the pattern distribution in FIG. 6(a).

Such a shift in the average value occurs when the adaptive equalization processing on the reproduction signal using the PRML method is insufficient, namely, when there is a remaining equalization error. Such a shift in the average value occurs because under the condition in which the recording density exceeds the optical resolution, there is a restriction on the circuit scale, components and the like of the reading apparatus.

Such a shift in the average value also occurs for a 3-bit error.

In FIG. 5 and FIG. 6, edge detection performed by averaging the average values of the pattern distributions is not influenced by noise. By contrast, when pattern distributions having different Euclidean distances are used (for example, the left part of the pattern distribution in FIG. 5(a) and the right part of the pattern distribution in FIG. 6(a)), edge detection performed by averaging the average values of the pattern distributions is influenced by noise.

As described above, in Patent Document No. 2, the recording control is influenced by the reproduction noise.

FIG. 7 shows an example of tables of recording parameters.

FIG. 7 illustrates recording compensation (space compensation) on the recording parameters. FIG. 7(a) shows the relationship between the recording mark length and the space before the recording mark (previous space) with respect to the leading edge, and FIG. 7(b) shows the relationship between the recording mark length and the space after the recording mark (subsequent space) with respect to the trailing edge.

In FIG. 7, symbols of the recording mark M(i), the previous space S(i−1) and the subsequent space S(i+1) are used in a time series representation of recording marks and spaces as shown in FIG. 8. Symbol M represents a recording mark, and symbol S represents a space. The position in time series of an arbitrary recording mark or space is represented using symbol i. The recording marks in the recording parameters in FIG. 7 are represented by M(i).

Accordingly, the previous space to the recording mark M(i) is S(i−1), and the subsequent space to the recording mark M(i) is S(i+1). Thus, for example, pattern 3Ts4Tm at the leading edge in FIG. 7 has the relationships of S(i−1)=3T and M(i)=4T. Pattern 3Tm2Ts at the trailing edge has the relationships of M(i)=3T and S(i+1)=2T.

For example, in FIG. 7, Ttop and dTtop are set as parameters at the leading edge, and Tlp and dTs are set as parameters at the trailing edge.

In both of Patent Document No. 1 and Patent Document No. 2, as shown in FIG. 7, the recording parameters are set only for the previous space at the leading edge and only for the subsequent space at the trailing edge.

However, as described above, at high density recording, an influence of thermal interference of the recording mark of interest itself occurs. Therefore, it is necessary to set the recording parameters for the previous space and the subsequence space.

From the above, for performing high density recording exceeding the optical resolution, it is necessary to conduct recording adjustment which reduces the influence of noise on the Euclidean distance differences in the PRML method and also considers the influence of thermal interference of the recording mark of interest itself. Therefore, the conventional recording adjustment of setting recording parameters only for the previous space or only the subsequent space by edge detection has a problem of insufficient performance, especially for a signal in which a recording mark and a space of the shortest length are repeated.

The present invention made to solve such a problem provides an information reading method and an information recording method for optimizing recording parameters at the time of information recording such that the probability of errors is minimized when maximum likelihood decoding is performed in high density recording, and an information recording medium for storing a recording condition adjusted by such a method.

Solution to Problem

An information reading method according to the present invention includes a reading step of decoding information from a reproduction signal read from an information recording medium; and a detection step of detecting a length error and a phase error of a recording mark based on a difference between squares of Euclidean distances between a plurality of error patterns corresponding to a correct pattern obtained by the decoding and the reproduction signal. The detection step includes the step of detecting a first error pattern and a second error pattern among the plurality of error patterns. A square of a Euclidean distance between the first error pattern and the correct pattern and a square of a Euclidean distance between the second error pattern and the correct pattern are different from each other. The detection step further includes the steps of calculating a first pattern shift amount by normalizing a difference between the square of the Euclidean distance between the first error pattern and the reproduction signal and a square of a Euclidean distance between the correct pattern and the reproduction signal, using the square of the Euclidean distance between the correct pattern and the first error pattern, in accordance with a time relationship between the correct pattern and the first error pattern; calculating a second pattern shift amount by normalizing a difference between the square of the Euclidean distance between the second error pattern and the reproduction signal and the square of the Euclidean distance between the correct pattern and the reproduction signal, using the square of the Euclidean distance between the correct pattern and the second error pattern, in accordance with a time relationship between the correct pattern and the second error pattern; and calculating the length error and the phase error by a sum of, or a difference between, the first pattern shift amount and the second pattern shift amount.

According to an embodiment, the number of error bits in the first error pattern is identical; the number of error bits in the second error pattern is identical; and the number of error bits in the first error pattern and the number of error bits in the second error pattern are different from each other.

According to an embodiment, the first error pattern includes an error pattern in which a recording mark or a space of a shortest run length in the information is shifted forward by 1 bit; and an error pattern in which the recording mark or the space of the shortest run length in the information is shifted rearward by 1 bit. The second error pattern is an error pattern caused by an edge shift of the recording mark of the shortest run length in the information.

According to an embodiment, where λ is the wavelength of laser light used for reading the information and NA is the numerical aperture of an objective lens, a length of the recording mark and the space of the shortest run length is equal to or less than λ/(4×NA).

According to an embodiment, the wavelength λ of the laser light is 400 nm to 410 nm, and the numerical aperture NA of the objective lens is 0.84 to 0.86.

According to an embodiment the length error and the phase error are respectively calculated in two groups between which the order of the recording mark and the space of the shortest run length is inverted to each other.

An information reading method according to the present invention reads information from an information recording medium on which information using RLL(1,7) codes having a shortest run length of 2T is formed as recording marks and spaces having a plurality of lengths. The information reading method includes a reading step of decoding the information from a reproduction signal read from the information recording medium using a PRML method, which is PR(1,2,2,2,1) ML; and a detection step of detecting a length error and a phase error of a recording mark based on a difference between squares of Euclidean distances between a plurality of error patterns corresponding to a correct pattern identifiable by the PRML method and the reproduction signal. The detection step includes the step of detecting a first error pattern and a second error pattern among the plurality of error patterns. A square of a Euclidean distance between the first error pattern and the correct pattern and a square of a Euclidean distance between the second error pattern and the correct pattern are different from each other. In the case where the correct pattern has a bit sequence of "1110011000" and the first error pattern includes "1100111000" and "1110001100" and in the case where the correct pattern has a bit sequence of "0001100111" and the first error pattern includes "0011000111" and "0001110011", the detection step further includes the steps of calculating a first pattern shift amount by normalizing a difference between the square of the Euclidean distance between the first error pattern and the reproduction signal and a square of a Euclidean distance between the correct pattern and the reproduction signal, using the square of the Euclidean distance between the correct pattern and the first error pattern, in accordance with a time relationship between the correct pattern and the first error pattern; calculating a second pattern shift amount by normalizing a difference between the square of the Euclidean distance between the second error pattern and the reproduction signal and the square of the Euclidean distance between the correct pattern and the reproduction signal, using the square of the Euclidean distance between the correct pattern and the second error pattern, in accordance with a time relationship between the correct pattern and the second error pattern; and calculating the length error and the phase error by a sum of, or a difference between, the first pattern shift amount and the second pattern shift amount.

An information recording method according to the present invention includes a reading step of decoding information from a reproduction signal read from an information recording medium; a detection step of detecting a length error and a phase error of a recording mark based on a difference between squares of Euclidean distances between a plurality of error patterns corresponding to a correct pattern decoded and the reproduction signal; an adjustment step of adjusting a recording condition for recording information on the information recording medium based on the length error and the phase error; and a recording step of recording the information on the information recording medium based on the recording condition. The detection step includes the step of detecting a first error pattern and second error pattern among the plurality of error patterns. A square of a Euclidean distance between the first error pattern and the correct pattern and a square of a Euclidean distance between the second error pattern and the correct pattern are different from each other. The detection step further includes the steps of calculating a first pattern shift amount by normalizing a difference between the square of the Euclidean distance between the first error pattern and the reproduction signal and a square of a Euclidean distance between the correct pattern and the reproduction signal, using the square of the Euclidean distance between the correct pattern and the first error pattern, in accordance with a time relationship between the correct pattern and the first error pattern; calculating a second pattern shift amount by normalizing a difference between the square of the Euclidean distance between the second error pattern and the reproduction signal and the square of the Euclidean distance between the correct pattern and the reproduction signal, using the square of the Euclidean distance between the correct pattern and the second error pattern, in accordance with a time relationship between the correct pattern and the second error pattern; and calculating the length error and the phase error by a sum of, or a difference between, the first pattern shift amount and the second pattern shift amount.

An information recording medium according to the present invention is an information recording medium having a track, in which information is recorded on the track, and information is decoded from a reproduction signal obtained by reading the track. A plurality of error patterns corresponding to a correct pattern to be decoded are detected; and the first error pattern and the second error pattern are detected among the plurality of error patterns. A square of a Euclidean distance between the first error pattern and the correct pattern and a square of a Euclidean distance between the second error pattern and the correct pattern are different from each other. A first pattern shift amount is calculated by normalizing a difference between a square of a Euclidean distance between the first error pattern and the reproduction signal and a square of a Euclidean distance between the correct pattern and the reproduction signal, using the square of the Euclidean distance between the correct pattern and the first error pattern, in accordance with a time relationship between the correct pattern and the first error pattern. A second pattern shift amount is calculated by normalizing a difference between a square of a Euclidean distance between the second error pattern and the reproduction signal and the square of the Euclidean distance between the correct pattern and the reproduction signal, using the square of the Euclidean distance between the correct pattern and the second error pattern, in accordance with a time relationship between the correct pattern and the second error pattern. The length error and the phase error are calculated by a sum of, or a difference between, the first pattern shift amount and the second pattern shift amount; and a recording condition adjusted based on the length error and the phase error is recorded.

An information reading apparatus according to the present invention is an information reading apparatus for reading information from the information recording medium; and includes an optical head section for irradiating the information recording medium with laser light, and a reading section for decoding information from a reproduction signal read from the information recording medium.

An information recording/reading apparatus according to the present invention includes a reading section for generating a digital signal from an analog signal representing information read from an information recording medium; a recording adjustment section for detecting a correct pattern identifiable by a PRML method and at least two error patterns corresponding to the correct pattern and having different Euclidean distances to the correct pattern, detecting a pattern shift, which is a difference between a square of a Euclidean distance between the digital signal and the correct pattern and a square of a Euclidean distance between the digital signal and each of the error patterns, calculating a signal index value, which represents a length error or a phase error, based on the pattern shift, and adjusting a recording condition for recording the information on the information recording medium based on the signal index value; and a recording section for recording the information on the information recording medium based on the recording condition. One of the error patterns includes at least a first error pattern and a second error pattern having an identical Euclidean distance to the correct pattern and an identical number of error bits with respect to the correct pattern. The recording adjustment section calculates the signal index value based on a difference between the pattern shift detected using the first error pattern and the pattern shift detected using the second error pattern, and the pattern shift detected using another error pattern.

According to one embodiment, a recording pulse or a recording power is adjusted such that the signal index value is closest to 0 or such that an absolute value of the signal index value is minimized.

According to one embodiment, the first error pattern is an error pattern in which a recording mark or a space of a shortest run length in the information is shifted forward by 1 bit, and the second error pattern is an error pattern in which the recording mark or the space of the shortest run length in the information is shifted rearward by 1 bit.

According to one embodiment, the PRML method is PR(1, 2,2,2,1)ML, and the information uses a code having the shortest run length of 2T. For a bit sequence "1110011000" of the correct pattern, the first error pattern is "1100111000", and the second error pattern is "1110001100". Alternatively, for a bit sequence "0001100111" of the correct pattern, the first error pattern is "0011000111", and the second error pattern is "0001110011".

According to one embodiment, the first error pattern is an error pattern in which a continuous sequence of a recording mark and a space each of a shortest run length in the information is shifted forward by 1 bit, and the second error pattern is an error pattern in which a continuous sequence of a recording mark and a space each of the shortest run length in the information is shifted rearward by 1 bit.

According to one embodiment, the PRML method is PR(1, 2,2,2,1)ML, and the information uses a code having the shortest run length of 2T. For a bit sequence "1110011000" of the correct pattern, the first error pattern is "1100110000", and the second error pattern is "1111001100". Alternatively, for a bit sequence "0001100111" of the correct pattern, the first error pattern is "0011001111", and the second error pattern is "0000110011".

According to one embodiment, where $\lambda$ is the wavelength of laser light in the information recording/reading apparatus and NA is the numerical aperture of an objective lens, a length of the recording mark and the space of the shortest run length is equal to or less than $\lambda/(4 \times NA)$.

According to one embodiment, the wavelength $\lambda$, of the laser light is 400 nm to 410 nm.

According to one embodiment, the numerical aperture NA of the objective lens is 0.84 to 0.86.

According to one embodiment, the one of the error patterns further includes a third error pattern and a fourth error pattern having an identical Euclidean distance to the correct pattern and an identical number of error bits with respect to the correct pattern. The Euclidean distance of the third error pattern to the correct pattern is the same as the Euclidean distance of the first error pattern to the correct pattern, and the number of error bits of the third error pattern with respect to the correct pattern is different from the number of error bits of the first error pattern with respect to the correct pattern. The signal index value is further calculated using a difference between a pattern shift detected using the third error pattern and a pattern shift detected using the fourth error pattern.

According to one embodiment, the first error pattern is an error pattern in which a recording mark or a space of a shortest run length in the information is shifted forward by 1 bit, and the second error pattern is an error pattern in which a recording mark or a space of the shortest run length in the information is shifted rearward by 1 bit. The third error pattern is an error pattern in which a continuous sequence of a recording mark and a space each of the shortest run length in the information is shifted forward by 1 bit, and the fourth error pattern is an error pattern in which a continuous sequence of a recording mark and a space each of the shortest run length in the information is shifted rearward by 1 bit.

According to one embodiment, the PRML method is PR(1, 2,2,2,1)ML, and the information uses a code having the shortest run length of 2T. For a bit sequence "1110011000" of the correct pattern, the first error pattern is "1100111000", the second error pattern is "1110001100", the third error pattern is "1100110000", and the fourth error pattern is "1111001100". Alternatively, for a bit sequence "0001100111" of the correct pattern, the first error pattern is "0011000111", the second error pattern is "0001110011", the third error pattern is "0011001111", and the fourth error pattern is "0000110011".

An information recording/reading apparatus according to the present invention includes a reading section for generating a digital signal from an analog signal representing information read from an information recording medium; a recording adjustment section for detecting a correct pattern identifiable by a PRML method and at least two error patterns corresponding to the correct pattern and having different Euclidean distances to the correct pattern, detecting a pattern shift, which is a difference between a square of a Euclidean distance between the digital signal and the correct pattern and a square of a Euclidean distance between the digital signal and each of the error patterns, calculating a signal index value, which represents a length error and a phase error, based on the pattern shift, and adjusting a recording condition for recording the information on the information recording medium based on the signal index value; and a recording section for recording the information on the information recording medium based on the recording condition.

One of the error patterns includes at least a first error pattern and a second error pattern having an identical Euclidean distance to the correct pattern and an identical number of error bits with respect to the correct pattern. The recording adjustment section calculates the signal index value based on a difference between the pattern shift detected using the first error pattern and the pattern shift detected using the second error pattern, and the pattern shift detected using another error pattern. A sign of at least one coefficient regarding the difference between the pattern shifts is inverted between for calculating the length error and for calculating the phase error.

An information recording/reading apparatus according to the present invention includes a reading section for generating a digital signal from an analog signal representing information read from an information recording medium; a recording adjustment section for detecting a correct pattern identifiable by a PRML method and at least two error patterns corresponding to the correct pattern and having different Euclidean distances to the correct pattern, detecting a pattern shift, which is a difference between a square of a Euclidean distance between the digital signal and the correct pattern and a square of a Euclidean distance between the digital signal and each of the error patterns, calculating a signal index value, which represents a length error or a phase error, based on the pattern shift, and adjusting recording conditions for recording the information on the information recording medium based on the signal index value in the state where the recording conditions are classified into groups which are different in the order of a recording mark and a space of a shortest run length in the information; and a recording section for recording the information on the information recording medium based on the recording conditions. One of the error patterns in the groups includes at least a first error pattern and a second error pattern having an identical Euclidean distance to the correct pattern and an identical number of error bits with respect to the correct pattern. The recording adjustment section calculates the signal index value based on a difference between the pattern shift detected using the first error pattern and the pattern shift detected using the second error pattern, and the pattern shift detected using another error pattern.

According to one embodiment, a coefficient regarding the difference between the pattern shifts is inverted among the groups.

According to one embodiment, the first error pattern and the second error pattern have an identical Euclidean distance to the correct pattern and an identical number of error bits with respect to the correct pattern also regarding to each of the groups classified.

According to one embodiment, the number of error patterns detected is the same among the groups.

According to one embodiment, the orders of the recording mark and the space of the shortest run length in the groups are "space/recording mark", "recording mark/space", and "space/recording mark/space". The recording adjustment section adjusts the recording conditions on "space/recording mark" and "recording mark/space" based on the signal index value, and determines the recording condition for "space/recording mark/space" based on the adjusted recording conditions.

An information recording/reading apparatus according to the present invention includes a reading section for generating a digital signal from an analog signal representing information read from an information recording medium; a recording adjustment section for detecting a correct pattern identifiable by a PRML method and at least two error patterns corresponding to the correct pattern and having different Euclidean distances to the correct pattern, detecting a pattern shift, which is a difference between a square of a Euclidean distance between the digital signal and the correct pattern and a square of a Euclidean distance between the digital signal and each of the error patterns, calculating a signal index value, which represents a length error and a phase error, based on the pattern shift, and adjusting recording conditions for recording the information on the information recording medium based on the signal index value in the state where the recording conditions are classified into groups which are different in the order of a recording mark and a space of a shortest run length in the information; and a recording section for recording the information on the information recording medium based on the recording conditions. One of the error patterns in the groups includes at least a first error pattern and a second error pattern having an identical Euclidean distance to the correct pattern and an identical number of error bits with respect to the correct pattern. The recording adjustment section calculates the signal index value based on a difference between the pattern shift detected using the first error pattern and the pattern shift detected using the second error pattern, and the pattern shift detected using another error pattern. A sign of a coefficient regarding the difference between the pattern shifts in at least one of the groups is inverted between for calculating the length error and for calculating the phase error.

An information recording/reading method according to the present invention includes a reading step of generating a digital signal from an analog signal representing information read from an information recording medium; a recording adjustment step of detecting a correct pattern identifiable by a PRML method and at least two error patterns corresponding to the correct pattern and having different Euclidean distances to the correct pattern, detecting a pattern shift, which is a difference between a square of a Euclidean distance between the digital signal and the correct pattern and a square of a Euclidean distance between the digital signal and each of the error patterns, calculating a signal index value, which represents a length error or a phase error, based on the pattern shift, and adjusting a recording condition for recording the information on the information recording medium based on the signal index value; and a recording step of recording the information on the information recording medium based on the recording condition. One of the error patterns includes at least a first error pattern and a second error pattern having an identical Euclidean distance to the correct pattern and an identical number of error bits with respect to the correct pattern. The recording adjustment step calculates the signal index value based on a difference between the pattern shift detected using the first error pattern and the pattern shift detected using the second error pattern, and the pattern shift detected using another error pattern.

According to one embodiment, a recording pulse or a recording power is adjusted such that the signal index value is closest to 0 or such that an absolute value of the signal index value is minimized.

According to one embodiment, the first error pattern is an error pattern in which a recording mark or a space of a shortest run length in the information is shifted forward by 1 bit, and the second error pattern is an error pattern in which a recording mark or a space of the shortest run length in the information is shifted rearward by 1 bit.

According to one embodiment, the PRML method is PR(1, 2,2,2,1)ML, and the information uses a code having the shortest run length of 2T. For a bit sequence "1110011000" of the correct pattern, the first error pattern is "1100111000", and the second error pattern is "1110001100". Alternatively, for a bit sequence "0001100111" of the correct pattern, the first error pattern is "0011000111", and the second error pattern is "0001110011".

According to one embodiment, the first error pattern is an error pattern in which a continuous sequence of a recording mark and a space each of a shortest run length in the information is shifted forward by 1 bit, and the second error pattern is an error pattern in which a continuous sequence of a recording mark and a space each of the shortest run length in the information is shifted rearward by 1 bit.

According to one embodiment, the PRML method is PR(1, 2,2,2,1)ML, and the information uses a code having the shortest run length of 2T. For a bit sequence "1110011000" of the correct pattern, the first error pattern is "1100110000", and the second error pattern is "1111001100". Alternatively, for a bit sequence "0001100111" of the correct pattern, the first error pattern is "0011001111", and the second error pattern is "0000110011".

According to one embodiment, where λ is the wavelength of laser light in the information recording/reading method and NA is the numerical aperture of an objective lens, a length of the recording mark and the space of the shortest run length is equal to or less than λ/(4×NA).

According to one embodiment, the wavelength 2 of the laser light is 400 nm to 410 nm.

According to one embodiment, the numerical aperture NA of the objective lens is 0.84 to 0.86.

According to one embodiment, the one of the error patterns further includes a third error pattern and a fourth error pattern having an identical Euclidean distance to the correct pattern and an identical number of error bits with respect to the correct pattern. The Euclidean distance of the third error pattern to the correct pattern is the same as the Euclidean distance of the first error pattern to the correct pattern, and the number of error bits of the third error pattern with respect to the correct pattern is different from the number of error bits of the first error pattern with respect to the correct pattern. The signal index value is further calculated using a difference between a pattern shift detected using the third error pattern and a pattern shift detected using the fourth error pattern.

According to one embodiment, the first error pattern is an error pattern in which a recording mark or a space of a shortest run length in the information is shifted forward by 1 bit, and the second error pattern is an error pattern in which a recording mark or a space of the shortest run length in the information is shifted rearward by 1 bit. The third error pattern is an error pattern in which a continuous sequence of a recording mark and a space each of the shortest run length in the information is shifted forward by 1 bit, and the fourth error pattern is an error pattern in which a continuous sequence of a recording mark and a space each of the shortest run length in the information is shifted rearward by 1 bit.

According to one embodiment, the PRML method is PR(1, 2,2,2,1)ML, and the information uses a code having the shortest run length of 2T. For a bit sequence "1110011000" of the correct pattern, the first error pattern is "1100111000", the second error pattern is "1110001100", the third error pattern is "1100110000", and the fourth error pattern is "1111001100". Alternatively, for a bit sequence "0001100111" of the correct pattern, the first error pattern is "0011000111", the second error pattern is "0001110011", the third error pattern is "0011001111", and the fourth error pattern is "0000110011".

An information recording/reading method according to the present invention includes a reading step of generating a digital signal from an analog signal representing information read from an information recording medium; a recording adjustment step of detecting a correct pattern identifiable by a PRML method and at least two error patterns corresponding to the correct pattern and having different Euclidean distances to the correct pattern, detecting a pattern shift, which is a difference between a square of a Euclidean distance between the digital signal and the correct pattern and a square of a Euclidean distance between the digital signal and each of the error patterns, calculating a signal index value, which represents a length error and a phase error, based on the pattern shift, and adjusting a recording condition for recording the information on the information recording medium based on the signal index value; and a recording step of recording the information on the information recording medium based on the recording condition. One of the error patterns includes at least a first error pattern and a second error pattern having an identical Euclidean distance to the correct pattern and an identical number of error bits with respect to the correct pattern. The recording adjustment step calculates the signal index value based on a difference between the pattern shift detected using the first error pattern and the pattern shift detected using the second error pattern, and the pattern shift detected using another error pattern. A sign of at least one coefficient regarding the difference between the pattern shifts is inverted between for calculating the length error and for calculating the phase error.

An information recording/reading method according to the present invention includes a reading step of generating a digital signal from an analog signal representing information read from an information recording medium; a recording adjustment step of detecting a correct pattern identifiable by a PRML method and at least two error patterns corresponding to the correct pattern and having different Euclidean distances to the correct pattern, detecting a pattern shift, which is a difference between a square of a Euclidean distance between the digital signal and the correct pattern and a square of a Euclidean distance between the digital signal and each of the error patterns, calculating a signal index value, which represents a length error or a phase error, based on the pattern shift, and adjusting recording conditions for recording the information on the information recording medium based on the signal index value in the state where the recording conditions are classified into groups which are different in the order of a recording mark and a space of a shortest run length in the information; and a recording step of recording the information on the information recording medium based on the recording conditions. One of the error patterns in the groups includes at least a first error pattern and a second error pattern having an identical Euclidean distance to the correct pattern and an identical number of error bits with respect to the correct pattern. The recording adjustment step calculates the signal index value based on a difference between the pattern shift detected using the first error pattern and the pattern shift detected using the second error pattern, and the pattern shift detected using another error pattern.

According to one embodiment, a coefficient regarding the difference between the pattern shifts is inverted among the groups.

According to one embodiment, the first error pattern and the second error pattern have an identical Euclidean distance to the correct pattern and an identical number of error bits with respect to the correct pattern also regarding to each of the groups.

According to one embodiment, the number of error patterns detected is the same among the groups.

According to one embodiment, the orders of the recording mark and the space of the shortest run length in the groups are "space/recording mark", "recording mark/space", and "space/recording mark/space". The recording adjustment step adjusts the recording conditions on "space/recording mark" and "recording mark/space" based on the signal index value, and determines the recording condition for "space/recording mark/space" based on the adjusted recording conditions.

An information recording/reading method according to the present invention includes a reading step of generating a digital signal from an analog signal representing information read from an information recording medium; a recording adjustment step of detecting a correct pattern identifiable by a PRML method and at least two error patterns corresponding to the correct pattern and having different Euclidean distances to the correct pattern, detecting a pattern shift, which is a difference between a square of a Euclidean distance between the digital signal and the correct pattern and a square of a Euclidean distance between the digital signal and each of the error patterns, calculating a signal index value, which represents a length error and a phase error, based on the pattern shift, and adjusting recording conditions for recording the information on the information recording medium based on the signal index value in the state where the recording conditions are classified into groups which are different in the order of a recording mark and a space of a shortest run length in the information; and a recording step of recording the information on the information recording medium based on the recording conditions. One of the error patterns in the groups includes at least a first error pattern and a second error pattern having an identical Euclidean distance to the correct pattern and an identical number of error bits with respect to the correct pattern. The recording adjustment step calculates the signal index value based on a difference between the pattern shift detected using the first error pattern and the pattern shift detected using the second error pattern, and the pattern shift detected using another error pattern. A sign of a coefficient regarding the difference between the pattern shifts in at least one of the groups is inverted between for calculating the length error and for calculating the phase error.

An information recording control apparatus according to the present invention detects, with respect to a reproduction signal representing information read from an information recording medium, a correct pattern identifiable by a PRML method and at least two error patterns corresponding to the correct pattern and having different Euclidean distances to the correct pattern; detects a pattern shift, which is a difference between a square of a Euclidean distance between the digital signal and the correct pattern and a square of a Euclidean distance between the digital signal and each of the error patterns; calculates a signal index value, which represents a length error or a phase error, based on the pattern shift; and adjusting a recording condition for recording the information on the information recording medium based on the signal index value. One of the error patterns includes at least a first error pattern and a second error pattern having an identical Euclidean distance to the correct pattern and an identical number of error bits with respect to the correct pattern. The signal index value is calculated based on a difference between the pattern shift detected using the first error pattern and the pattern shift detected using the second error pattern, and the pattern shift detected using another error pattern.

An information recording control method according to the present invention detects, with respect to a reproduction signal representing information read from an information recording medium, a correct pattern identifiable by a PRML method and at least two error patterns corresponding to the correct pattern and having different Euclidean distances to the correct pattern; detects a pattern shift, which is a difference between a square of a Euclidean distance between the digital signal and the correct pattern and a square of a Euclidean distance between the digital signal and each of the error patterns; calculates a signal index value, which represents a length error or a phase error, based on the pattern shift; and adjusting a recording condition for recording the information on the information recording medium based on the signal index value. One of the error patterns includes at least a first error pattern and a second error pattern having an identical Euclidean distance to the correct pattern and an identical number of error bits with respect to the correct pattern. The signal index value is calculated based on a difference between the pattern shift detected using the first error pattern and the pattern shift detected using the second error pattern, and the pattern shift detected using another error pattern.

ADVANTAGEOUS EFFECTS OF INVENTION

According to the present invention, information is decoded from a reproduction signal read from an information recording medium, and a length error and a phase error of a recording mark are detected based on a difference between squares of Euclidean distances between a plurality of error patterns corresponding to a correct pattern to be decoded and a reproduction signal. At this point, a first error pattern caused by a shift of a bit relating to a recording mark or a space of a shortest length, and a second error pattern caused by an edge shift of a recording mark, are used. In this case, the square of the Euclidean distance between the first error pattern and the correct pattern and the square of the Euclidean distance between the second error pattern and the correct pattern are different from each other. For each of the plurality of error patterns, a pattern shift obtained by normalizing a difference between the square of the Euclidean distance between each error pattern and the correct pattern and the square of the Euclidean distance between the correct pattern and the reproduction signal, using the square of the Euclidean distance between the correct pattern and the error pattern, is detected. The length error and the phase error are calculated based on a sum of, or a difference between, a first pattern shift amount obtained by normalization performed using the first error pattern and a second pattern shift amount obtained by normalization performed using the second error pattern.

In this case, the first error pattern includes at least an error pattern in which a recording mark or a space of the shortest length is bit-shifted forward and an error pattern in which a recording mark or a space of the shortest length is bit-shifted rearward. Based on the first pattern shift amount, an average position of the pattern shift detected from the error pattern in which the recording mark or the space is bit-shifted forward and the pattern shift detected from the error pattern in which the recording mark or the space is bit-shifted rearward can be detected. By finding the average position, amounts of the pattern shifts which occur forward and rearward by reproduction noise can be suppressed. Therefore, based on the first shift amount, edge detection can be performed with no influence of the reproduction noise.

As described above, according to the present invention, the length error and the phase error calculated using the first error pattern and the second error pattern having different squares of the Euclidean distances to the correct pattern can be detected property even if the reproduction noise is changed.

The present invention is especially effective to high density recording exceeding the optical resolution which includes an error caused by a shift of a bit relating a recording mark or a space of a shortest length. By adjusting a recording condition according to the present invention, high density recording exceeding the optical resolution can be performed with the error rate being reduced, and so a more stable recording/reading system can be provided.

BRIEF DESCRIPTION OF DRAWINGS

FIGS. 6(a) and (b) each illustrate a pattern distribution of a Euclidean distance difference for a 2-bit error.

FIGS. 7(a) and (b) each illustrate a recording parameter table.

FIG. 8 illustrates a time series of recording marks and spaces.

FIGS. 9(a) and (b) each illustrate a recording parameter pattern table according to the embodiment of the present invention.

FIGS. 10(a) through (c) illustrate classification of 2T-continuous patterns according to the embodiment of the present invention.

FIG. 21 is a flowchart showing an adjustment procedure of a length and a phase according to the embodiment of the present invention.

FIGS. 22(a) and (b) show change amounts of pattern shifts with respect to a change of a recording pulse in the SM pattern and the MS pattern.

FIG. 23 shows an information recording medium according to the embodiment of the present invention.

DESCRIPTION OF EMBODIMENTS

Figure 1:
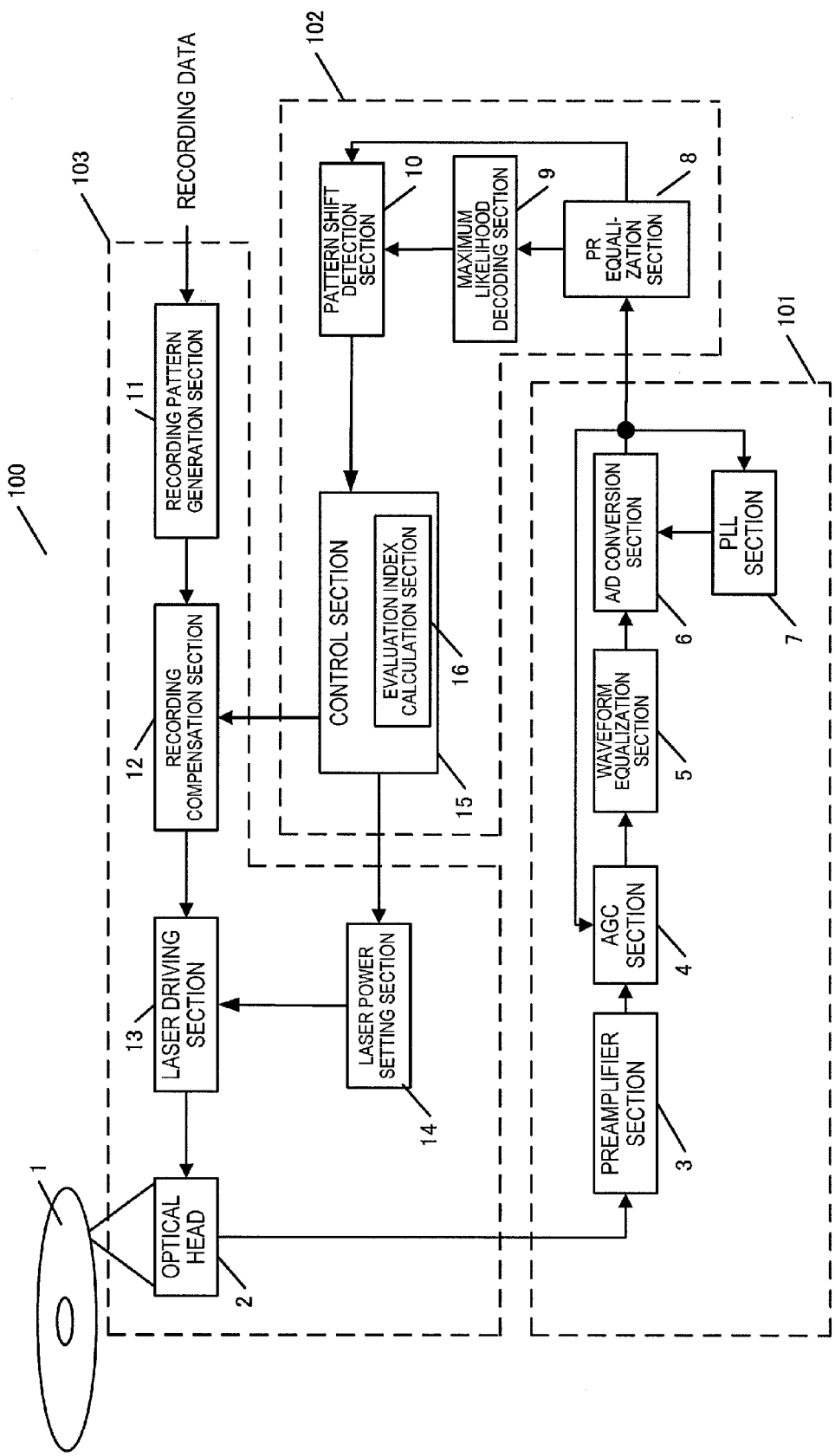
FIG. 1 shows an information recording/reading apparatus according to an embodiment of the present invention.

Hereinafter, embodiments of the present invention will be described with reference to the drawings. Like elements will be represented by like reference numerals, and descriptions thereof will not be repeated.

In an embodiment of the present invention, high density recording exceeding the optical resolution by the BD system will be described. As described above, the recording density exceeding the optical resolution corresponds to about 31 GB or greater. This embodiment is not limited to the recording density corresponding to about 31 GB or greater, and is applicable to the recording density corresponding to 30 GB, which is substantially the same as about 31 GB.

In this embodiment, for signal processing performed by the reading system, the PR(1,2,2,2,1)ML method is adopted. As the recording code, an RLL (Run Length Limited) code such as the RLL(1,7) code or the like is used. The description will be given assuming that the shortest run length of the modulation code is 2T. Therefore, the length of 2T, which is the length of each of a shortest mark and a shortest space, is 119.1 nm or shorter.

First, a table of recording parameters, which are recording conditions in this embodiment, will be described (hereinafter, the table will be referred to as the "pattern table"). A recording condition in this embodiment will be described as a recording pulse condition, but may be any other recording parameter such as a recording power condition or the like.

FIG. 9 shows pattern tables of recording parameters in this embodiment.

FIG. 9(a) shows a pattern table of recording parameters on the leading edge of a recording mark, and FIG. 9(b) shows a pattern table of recording parameters on the trailing edge of the recording mark. A characteristic of this embodiment is that the recording parameters are set on both of the previous space and the subsequent space (hereinafter, referred to as the "previous and subsequent spaces") for recording a shortest mark.

In FIG. 9(a), the recording parameter settings are made separately in accordance with the length of the subsequent space.

In FIG. 9(b), the recording parameter settings are made separately in accordance with the length of the previous space.

In FIG. 9, the recording mark as the target of the recording parameter setting is represented by recording mark M(i) as in FIG. 7 and FIG. 6 described above. The other spaces and recording marks are represented by substantially the same symbols. In FIG. 9(a), symbol !2Ts for S(i+1) indicates that the subsequent space is other than a 2T space, namely, a 3T or longer space (for example, a 3T space). This is also applicable to symbol !2Ts for S(i−1) in FIG. 9(b).

Figure 3:
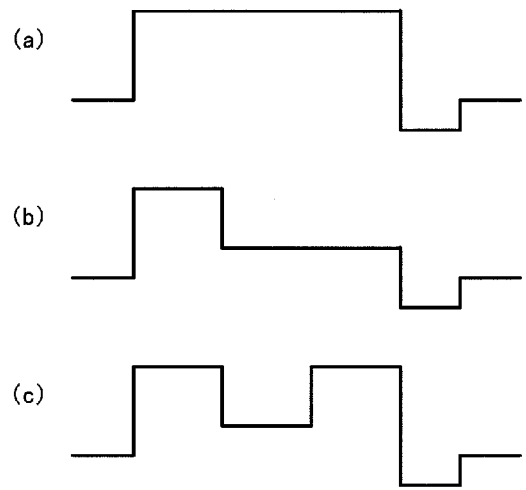
FIGS. 3(a) through (c) illustrate recording pulse waveforms.
Figure 4:
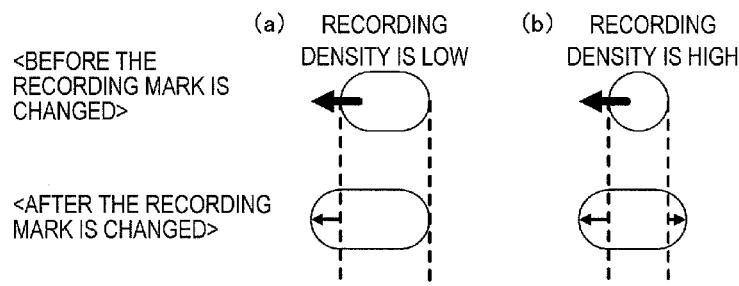
FIGS. 4(a) and (b) illustrate a change of the shape of a recording mark which differs by the recording density.
Figure 5:
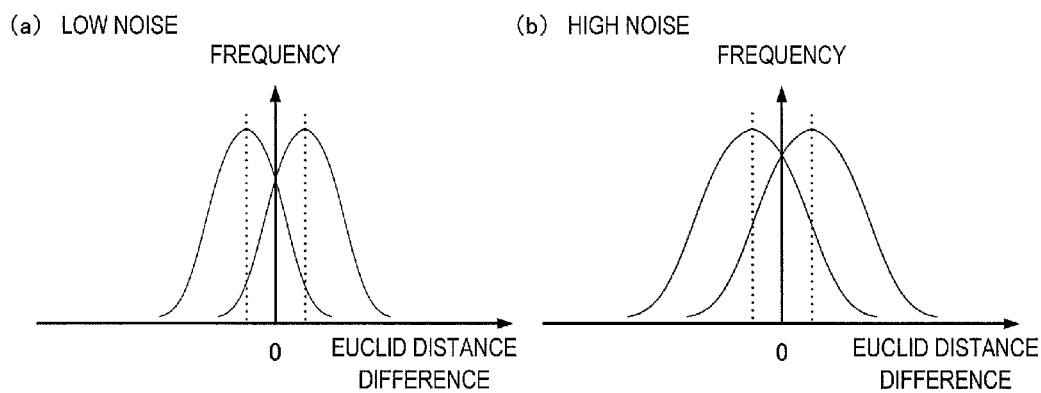
FIGS. 5(a) and (b) each illustrate a pattern distribution of a Euclidean distance difference for a 1-bit error.

Accordingly, the parameters for the shortest mark 2Tm are set on the previous and subsequent spaces. For example, in FIG. 9(a), 3Ts2Tm2Ts means that the previous space is a 3T space and the subsequent space is a 2T space.

Symbol xTs means that it is not necessary to specifically limit the length of the space.

The pattern representations substantially the same as those in FIG. 7 are provided with parentheses "( )". For example, pattern 2Ts3Tm in FIG. 7(a) is represented in FIG. 9(a) as pattern (2Ts3Tm). This is also applicable to the other patterns.

In FIG. 9, the patterns including a recording mark other than the shortest mark, namely, the patterns including a 3T or longer recording mark, are the same as in the conventional pattern table shown in FIG. 7. Only when the recording mark M(i) is the shortest mark, the pattern representation is different in accordance with the length of the subsequent space S(i+1) in FIG. 9(a) and in accordance with the length of the previous space S(i−1) in FIG. 9(b). This means that the recording parameter settings are made separately in accordance with the length of the space subsequent to, or previous to, the shortest mark.

As described above, in this embodiment, recording parameter settings are made separately in accordance with the length of the space subsequent to, or previous to, the shortest mark, such that a more appropriate recording mark can be formed even at high density recording which causes thermal interference of the recording mark of interest itself.

In FIG. 9, "SMS group", "SM group" and "MS group" are recording parameters relating to 2T-continuous patterns.

Now, classification of the 2T-continuous patterns, namely, classification of patterns in which a shortest recording mark and a shortest space are repeated, in this embodiment will be described.

FIG. 10 shows the classification of 2T-continuous patterns.

In FIG. 10(a), the recording mark is a 2T mark, the previous space is a 2T space, and the subsequent space is a 2T space. In FIG. 10(b), the recording mark is a 2T mark, the previous space is a 2T space, and the subsequent space is a 3T or longer space. In FIG. 10(c), the recording mark is a 2T mark, the previous space is a 3T or longer space, and the subsequent space is a 2T space. X and Y may each be any integer.

In FIG. 10(a), the previous and subsequent spaces are each a 2T space. In FIG. 10(b) and FIG. 10(c), one of the previous space and the subsequent space is a 2T space. Therefore, in the 2T-continuous pattern in FIG. 10(a), a 2T mark is included and at least three 2T mark/space are continuous. In the 2T-continuous pattern in FIG. 10(b) and FIG. 10(c), a 2T mark is included and at least two 2T mark/space are continuous.

In this embodiment, the 2T-continuous pattern in FIG. 10(a) is called the "SMS pattern", the 2T-continuous pattern in FIG. 10(b) is called the "SM pattern", and the 2T-continuous pattern in FIG. 10(c) is called the "MS pattern".

As described above, the SMS group, the SM group and the MS group in FIG. 9 are recording parameters relating to the 2T-continuous pattern.

The SMS group in FIG. 9 is the recording parameter for the SMS pattern in FIG. 10(a). The SMS group is 2Ts2Tm2Ts for the leading edge in FIG. 9(a), and is 2Ts2Tm2Ts for the trailing edge in FIG. 9(b).

The SM group in FIG. 9 is the recording parameter for the SM pattern in FIG. 10(b). The SM group is 2Ts2Tm!2Ts for the leading edge in FIG. 9(a), and is 2Ts2Tm3Ts, 2Ts2Tm4Ts, or 2Ts2Tm5Ts for the trailing edge in FIG. 9(b).

The MS group in FIG. 9 is the recording parameter for the MS pattern in FIG. 10(c). The SM group is 3Ts2Tm2Ts, 4Ts2Tm2Ts or 5Ts2Tm2Ts for the leading edge in FIG. 9(a), and is !2Ts2Tm2Ts for the trailing edge in FIG. 9(b).

Accordingly, recording adjustment for the 2T-continuous patterns can be done by the recording parameter for each type of the 2T-continuous patterns classified above.

Among the recording parameters for the patterns including a 2T recording mark in FIG. 9, the recording parameters other than the SMS group, the SM group and the MS group (for example, 3Ts2Tm!2Ts in FIG. 9(a)) are not recording parameters for 2T-continuous patterns. These parameters may be used for recording adjustment performed using the conventional technology. Namely, the leading edge in FIG. 9(a) may be adjusted for the previous space, and the trailing edge in FIG. 9(b) may be adjusted for the subsequent space.

In this embodiment, as shown in FIG. 9(a), the recording parameter settings for the subsequent spaces corresponding to the same length of previous spaces are made separately for the shortest space 2Ts or the non-shortest space (!2T). Such separate settings are made based on the shortest space, which is most significantly influenced by the thermal interference, and are made in consideration of the scale of the circuit which stores the recording parameters. This embodiment is not limited to this. For example, the recording parameter settings may be made separately for different lengths of the 3T or longer subsequent spaces (for example, separately for the 3T space, 4T space and $\geq$5T space as for the previous spaces). This is also applicable to the recording parameter settings for the previous spaces in FIG. 9(b).

Alternatively, all the recording parameters may be set based on the previous spaces or the subsequent spaces (either FIG. 9(a) or FIG. 9(b)). In this case also, each of the 2T-continuous patterns are classified in substantially the same manner.

In FIG. 9, the recording parameters for 2T marks are expanded because the 2T-continuous patterns are considered. For the 3T or longer recording marks, the previous and subsequent spaces may be set in substantially the same manner.

Now, edge detection used for performing recording adjustment on 2T-continuous patterns will be described.

Figure 11:
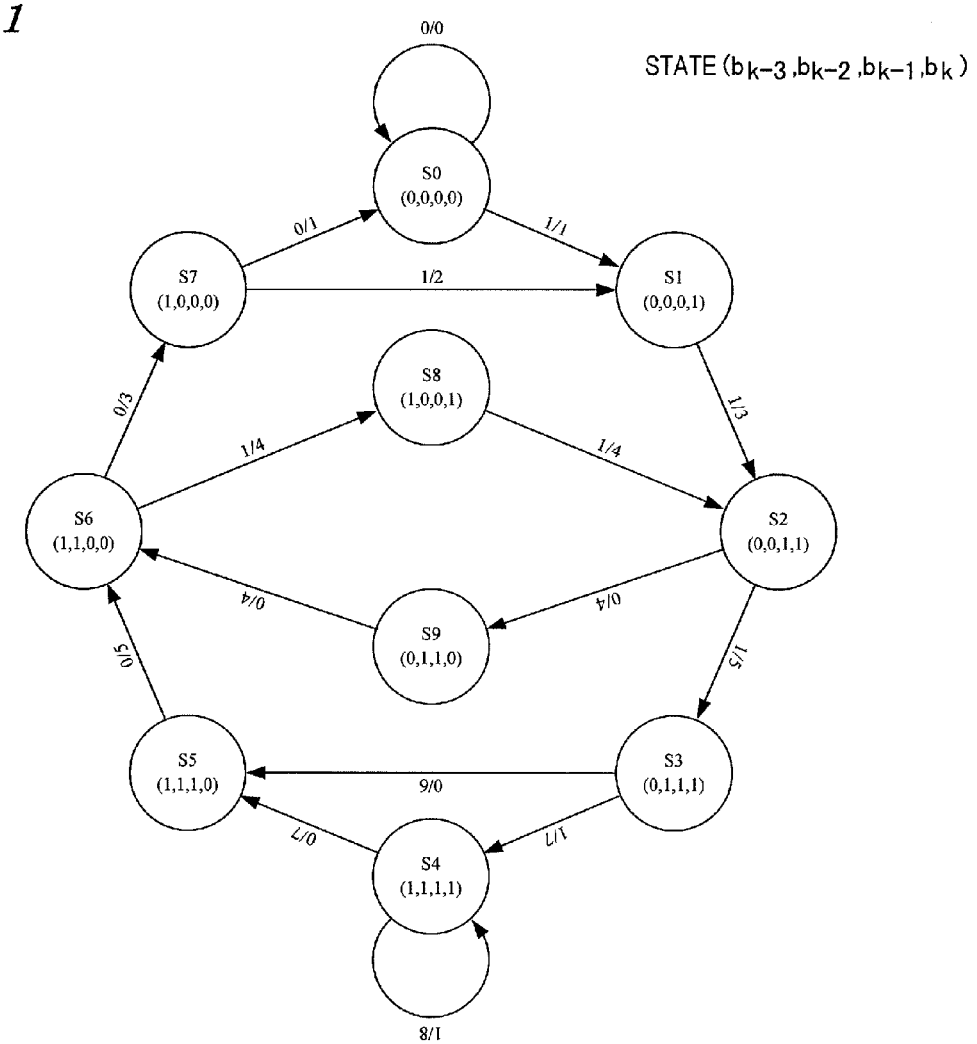
FIG. 11 shows a state transition rule defined by a RLL(1,7) recording code and an equalization method PR(1,2,2,2,1) according to the embodiment of the present invention the present invention.
Figure 12:
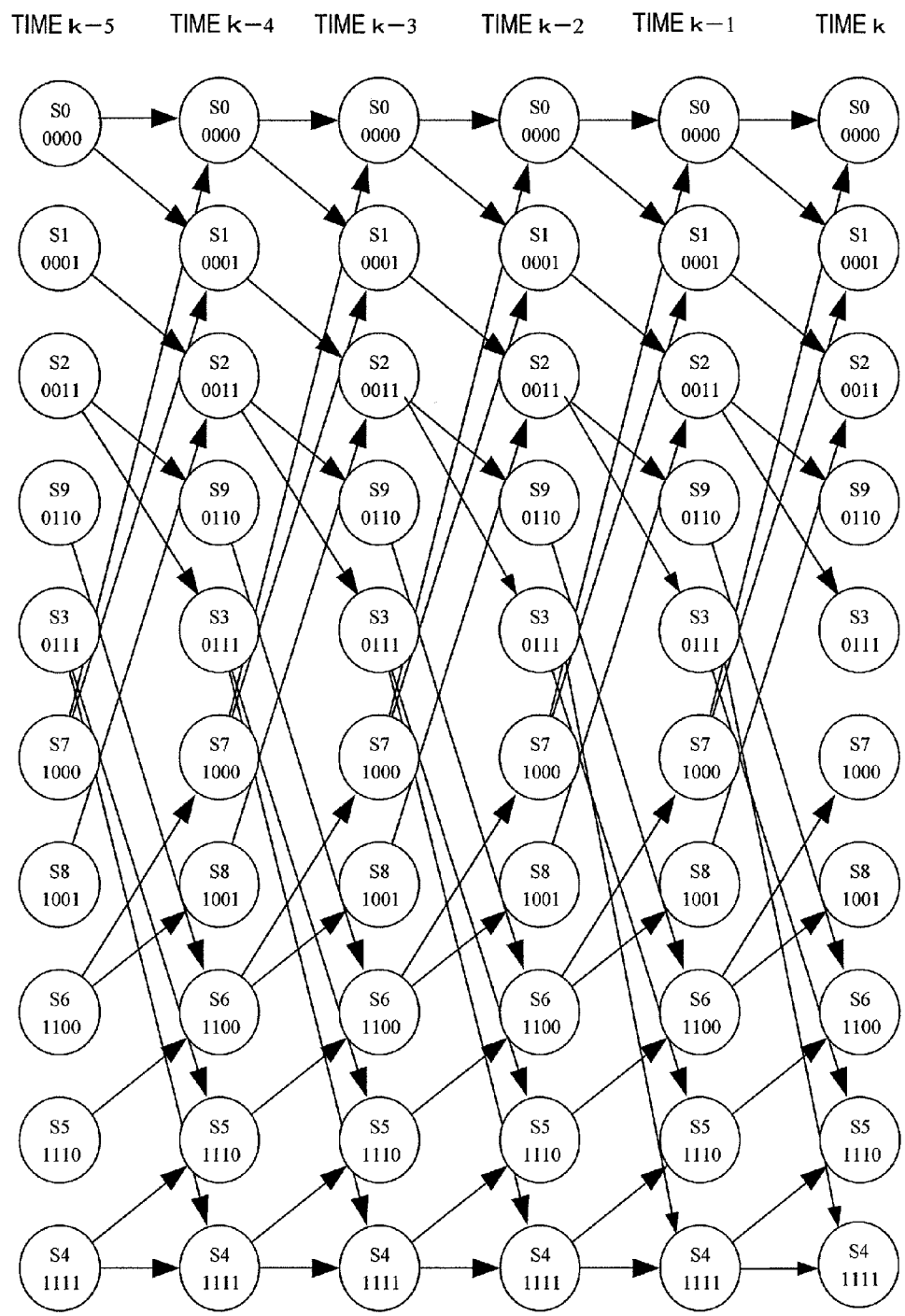
FIG. 12 is a trellis diagram corresponding to the state transition rule shown in FIG. 11 according to the embodiment of the present invention.

First, with reference to FIG. 11 and FIG. 12, PR(1,2,2,2,1)ML will be described briefly. FIG. 11 is a state transition diagram showing a state transition rule defined by the RLL (1,7) recording code and the equalization method PR(1,2,2,2,1). FIG. 12 is a trellis diagram corresponding to the state transition rule shown in FIG. 11.

By the combination of PR(1,2,2,2,1)ML and RLL(1,7), the number of states of decoding is limited to 10, the number of state transition paths is 16, and the number of reproduction levels is 9.

Referring to the state transition rule of PR(1,2,2,2,1)ML shown in FIG. 11, 10 states at a certain time are represented as follows. State S(0,0,0,0) is represented as "0, state S(0,0,0,1) is represented as S1, state S(0,0,1,1) is represented as S2, state S(0,1,1,1) is represented as S3, state S(1,1,1,1) is represented as S4, state S(1,1,1,0) is represented as S5, state S(1,1,0,0) is represented as S6, state S(1,0,0,0) is represented as S7, state S(1,0,0,1) is represented as S8, and state S(0,1,1,0) is represented as S9.

"0" or "1" in parentheses represents a signal on the time axis, and indicates which state will be likely to occur at the next time by a state transition from one state. The trellis diagram shown in FIG. 12 is obtained by developing this state transition diagram along the time axis.

In the state transition of PR(1,2,2,2,1)ML shown in FIG. 12, there are numerous state transition matrix patterns (state combinations) by which a prescribed state at one time is changed to another prescribed state at the next time via either one of two state transitions. However, the patterns which are highly likely to cause an error are limited to specific patterns which are difficult to be distinguished. Focusing on such patterns which are likely to cause an error, the state transition matrix patterns of PR(1,2,2,2,1)ML can be summarized as Tables 1, 2 and 3.

TABLE 1

| STATE TRANSITION | TRANSITION DATA SEQUENCE $(b_{k-i},\ldots,b_k)$ | DETECTION PATTERN | k − 9 | k − 8 | k − 7 | k − 6 | k − 5 | k − 4 | k − 3 | k − 2 |
|---|---|---|---|---|---|---|---|---|---|---|
| $S0_{k-5} \to S6_k$ | (0,0,0,0,x,1,1,0,0) | [14]1A |  |  |  |  | S0 | S1 | S2 | S3 |
|  |  | [14]1B |  |  |  |  | S0 | S0 | S1 | S2 |
| $S0_{k-5} \to S5_k$ | (0,0,0,0,x,1,1,1,0) | [14]2A |  |  |  |  | S0 | S1 | S2 | S3 |
|  |  | [14]2B |  |  |  |  | S0 | S0 | S1 | S2 |
| $S0_{k-5} \to S4_k$ | (0,0,0,0,x,1,1,1,1) | [14]3A |  |  |  |  | S0 | S1 | S2 | S3 |
|  |  | [14]3B |  |  |  |  | S0 | S0 | S1 | S2 |
| $S2_{k-5} \to S0_k$ | (0,0,1,1,x,0,0,0,0) | [14]4A |  |  |  |  | S2 | S3 | S5 | S6 |
|  |  | [14]4B |  |  |  |  | S2 | S9 | S6 | S7 |
| $S2_{k-5} \to S1_k$ | (0,0,1,1,x,0,0,0,1) | [14]5A |  |  |  |  | S2 | S3 | S5 | S6 |
|  |  | [14]5B |  |  |  |  | S2 | S9 | S6 | S7 |
| $S2_{k-5} \to S2_k$ | (0,0,1,1,x,0,0,1,1) | [14]6A |  |  |  |  | S2 | S3 | S5 | S6 |
|  |  | [14]6B |  |  |  |  | S2 | S9 | S6 | S7 |
| $S3_{k-5} \to S0_k$ | (0,1,1,1,x,0,0,0,0) | [14]7A |  |  |  |  | S3 | S4 | S5 | S6 |
|  |  | [14]7B |  |  |  |  | S3 | S5 | S6 | S7 |
| $S3_{k-5} \to S1_k$ | (0,1,1,1,x,0,0,0,1) | [14]8A |  |  |  |  | S3 | S4 | S5 | S6 |
|  |  | [14]8B |  |  |  |  | S3 | S5 | S6 | S7 |
| $S3_{k-5} \to S2_k$ | (0,1,1,1,x,0,0,1,1) | [14]9A |  |  |  |  | S3 | S4 | S5 | S6 |
|  |  | [14]9B |  |  |  |  | S3 | S5 | S6 | S7 |
| $S7_{k-5} \to S6_k$ | (1,0,0,0,x,1,1,0,0) | [14]10A |  |  |  |  | S7 | S1 | S2 | S3 |
|  |  | [14]10B |  |  |  |  | S7 | S0 | S1 | S2 |
| $S7_{k-5} \to S5_k$ | (1,0,0,0,x,1,1,1,0) | [14]11A |  |  |  |  | S7 | S1 | S2 | S3 |
|  |  | [14]11B |  |  |  |  | S7 | S0 | S1 | S2 |
| $S7_{k-5} \to S4_k$ | (1,0,0,0,x,1,1,1,1) | [14]12A |  |  |  |  | S7 | S1 | S2 | S3 |
|  |  | [14]12B |  |  |  |  | S7 | S0 | S1 | S2 |
| $S6_{k-5} \to S6_k$ | (1,1,0,0,x,1,1,0,0) | [14]13A |  |  |  |  | S6 | S8 | S2 | S3 |
|  |  | [14]13B |  |  |  |  | S6 | S7 | S1 | S2 |
| $S6_{k-5} \to S5_k$ | (1,1,0,0,x,1,1,1,0) | [14]14A |  |  |  |  | S6 | S8 | S2 | S3 |
|  |  | [14]14B |  |  |  |  | S6 | S7 | S1 | S2 |
| $S6_{k-5} \to S4_k$ | (1,1,0,0,x,1,1,1,1) | [14]15A |  |  |  |  | S6 | S8 | S2 | S3 |
|  |  | [14]15B |  |  |  |  | S6 | S7 | S1 | S2 |
| $S4_{k-5} \to S0_k$ | (1,1,1,1,x,0,0,0,0) | [14]16A |  |  |  |  | S4 | S4 | S5 | S6 |
|  |  | [14]16B |  |  |  |  | S4 | S5 | S6 | S7 |
| $S4_{k-5} \to S1_k$ | (1,1,1,1,x,0,0,0,1) | [14]17A |  |  |  |  | S4 | S4 | S5 | S6 |
|  |  | [14]17B |  |  |  |  | S4 | S5 | S6 | S7 |
| $S4_{k-5} \to S2_k$ | (1,1,1,1,x,0,0,1,1) | [14]18A |  |  |  |  | S4 | S4 | S5 | S6 |
|  |  | [14]18B |  |  |  |  | S4 | S5 | S6 | S7 |

| STATE TRANSITION | k − 1 | k | PR EQUALIZATION IDEAL VALUE | | | | | EUCLIDEAN DISTANCE DIFFERENCE |
|---|---|---|---|---|---|---|---|---|
| $S0_{k-5} \to S6_k$ | S5 | S6 | 1 | 3 | 5 | 6 | 5 | 14 |
|  | S9 | S6 | 0 | 1 | 3 | 4 | 4 |  |
| $S0_{k-5} \to S5_k$ | S5 | S5 | 1 | 3 | 5 | 7 | 7 | 14 |
|  | S3 | S5 | 0 | 1 | 3 | 5 | 6 |  |
| $S0_{k-5} \to S4_k$ | S4 | S4 | 1 | 3 | 5 | 7 | 8 | 14 |
|  | S3 | S4 | 0 | 1 | 3 | 5 | 7 |  |
| $S2_{k-5} \to S0_k$ | S7 | S0 | 5 | 6 | 5 | 3 | 1 | 14 |
|  | S0 | S0 | 4 | 4 | 3 | 1 | 0 |  |
| $S2_{k-5} \to S1_k$ | S7 | S1 | 5 | 6 | 5 | 3 | 2 | 14 |
|  | S0 | S1 | 4 | 4 | 3 | 1 | 1 |  |
| $S2_{k-5} \to S2_k$ | S8 | S2 | 5 | 6 | 5 | 4 | 4 | 14 |
|  | S1 | S2 | 4 | 4 | 3 | 2 | 3 |  |
| $S3_{k-5} \to S0_k$ | S7 | S0 | 7 | 7 | 5 | 3 | 1 | 14 |
|  | S0 | S0 | 6 | 5 | 3 | 1 | 0 |  |
| $S3_{k-5} \to S1_k$ | S7 | S1 | 7 | 7 | 5 | 3 | 2 | 14 |
|  | S0 | S1 | 6 | 5 | 3 | 1 | 1 |  |
| $S3_{k-5} \to S2_k$ | S8 | S2 | 7 | 7 | 5 | 4 | 4 | 14 |
|  | S1 | S2 | 6 | 5 | 3 | 2 | 3 |  |
| $S7_{k-5} \to S6_k$ | S5 | S6 | 2 | 3 | 5 | 6 | 5 | 14 |
|  | S9 | S6 | 1 | 1 | 3 | 4 | 4 |  |
| $S7_{k-5} \to S5_k$ | S4 | S5 | 2 | 3 | 5 | 7 | 7 | 14 |
|  | S3 | S5 | 1 | 1 | 3 | 5 | 6 |  |

TABLE 1-continued

| STATE TRANSITION | | | | | | | | |
|---|---|---|---|---|---|---|---|---|
| S7$_{k-5}$ → S4$_k$ | S4 | S4 | | 2 | 3 | 5 | 7 | 8 | 14 |
| | S3 | S4 | | 1 | 1 | 3 | 5 | 7 | |
| S6$_{k-5}$ → S6$_k$ | S5 | S6 | | 4 | 4 | 5 | 6 | 5 | 14 |
| | S9 | S6 | | 3 | 2 | 3 | 4 | 4 | |
| S6$_{k-5}$ → S5$_k$ | S4 | S5 | | 4 | 4 | 5 | 7 | 7 | 14 |
| | S3 | S5 | | 3 | 2 | 3 | 5 | 6 | |
| S6$_{k-5}$ → S4$_k$ | S4 | S4 | | 4 | 4 | 5 | 7 | 8 | 14 |
| | S3 | S4 | | 3 | 2 | 3 | 5 | 7 | |
| S4$_{k-5}$ → S0$_k$ | S7 | S0 | | 8 | 7 | 5 | 3 | 1 | 14 |
| | S0 | S0 | | 7 | 5 | 3 | 1 | 0 | |
| S4$_{k-5}$ → S1$_k$ | S7 | S1 | | 8 | 7 | 5 | 3 | 2 | 14 |
| | S0 | S1 | | 7 | 5 | 3 | 1 | 1 | |
| S4$_{k-5}$ → S2$_k$ | S8 | S2 | | 8 | 7 | 5 | 4 | 4 | 14 |
| | S1 | S2 | | 7 | 5 | 3 | 2 | 3 | |

TABLE 2

| STATE TRANSITION | TRANSITION DATA SEQUENCE ($b_{k-i}, \ldots, b_k$) | DETECTION PATTERN | k − 9 | k − 8 | k − 7 | k − 6 | k − 5 | k − 4 | k − 3 | k − 2 |
|---|---|---|---|---|---|---|---|---|---|---|
| S0$_{k-7}$ → S0$_k$ | (0,0,0,0,x,1,!x,0,0,0,0) | [12A]1A | | | S0 | S1 | S2 | S9 | S6 | S7 |
| | | [12A]1B | | | S0 | S0 | S1 | S2 | S9 | S6 |
| S0$_{k-7}$ → S1$_k$ | (0,0,0,0,x,1,!x,0,0,0,1) | [12A]2A | | | S0 | S1 | S2 | S9 | S6 | S7 |
| | | [12A]2B | | | S0 | S0 | S1 | S2 | S9 | S6 |
| S0$_{k-7}$ → S2$_k$ | (0,0,0,0,x,1,!x,0,0,1,1) | [12A]3A | | | S0 | S1 | S2 | S9 | S6 | S7 |
| | | [12A]3B | | | S0 | S0 | S1 | S2 | S9 | S6 |
| S2$_{k-7}$ → S6$_k$ | (0,0,1,1,x,0,!x,1,1,0,0) | [12A]4A | | | S2 | S3 | S5 | S6 | S8 | S2 |
| | | [12A]4B | | | S2 | S9 | S6 | S8 | S2 | S3 |
| S2$_{k-7}$ → S5$_k$ | (0,0,1,1,x,0,!x,1,1,1,0) | [12A]5A | | | S2 | S3 | S5 | S6 | S8 | S2 |
| | | [12A]5B | | | S2 | S9 | S6 | S8 | S2 | S3 |
| S2$_{k-7}$ → S4$_k$ | (0,0,1,1,x,0,!x,1,1,1,1) | [12A]6A | | | S2 | S3 | S5 | S6 | S8 | S2 |
| | | [12A]6B | | | S2 | S9 | S6 | S8 | S2 | S3 |
| S3$_{k-7}$ → S6$_k$ | (0,1,1,1,x,0,!x,1,1,0,0) | [12A]7A | | | S3 | S4 | S5 | S6 | S8 | S2 |
| | | [12A]7B | | | S3 | S5 | S6 | S8 | S2 | S3 |
| S3$_{k-7}$ → S5$_k$ | (0,1,1,1,x,0,!x,1,1,1,0) | [12A]8A | | | S3 | S4 | S5 | S6 | S8 | S2 |
| | | [12A]8B | | | S3 | S5 | S6 | S8 | S2 | S3 |
| S3$_{k-7}$ → S4$_k$ | (0,1,1,1,x,0,!x,1,1,1,1) | [12A]9A | | | S3 | S4 | S5 | S6 | S8 | S2 |
| | | [12A]9B | | | S3 | S5 | S6 | S8 | S2 | S3 |
| S7$_{k-7}$ → S0$_k$ | (1,0,0,0,x,1,!x,0,0,0,0) | [12A]10A | | | S7 | S1 | S2 | S9 | S6 | S7 |
| | | [12A]10B | | | S7 | S0 | S1 | S2 | S9 | S6 |
| S7$_{k-7}$ → S1$_k$ | (1,0,0,0,x,1,!x,0,0,0,1) | [12A]11A | | | S7 | S1 | S2 | S9 | S6 | S7 |
| | | [12A]11B | | | S7 | S0 | S1 | S2 | S9 | S6 |
| S7$_{k-7}$ → S2$_k$ | (1,0,0,0,x,1,!x,0,0,1,1) | [12A]12A | | | S7 | S1 | S2 | S9 | S6 | S7 |
| | | [12A]12B | | | S7 | S0 | S1 | S2 | S9 | S6 |
| S6$_{k-7}$ → S0$_k$ | (1,1,0,0,x,1,!x,0,0,0,0) | [12A]13A | | | S6 | S8 | S2 | S9 | S6 | S7 |
| | | [12A]13B | | | S6 | S7 | S1 | S2 | S9 | S6 |
| S6$_{k-7}$ → S1$_k$ | (1,1,0,0,x,1,!x,0,0,0,1) | [12A]14A | | | S6 | S8 | S2 | S9 | S6 | S7 |
| | | [12A]14B | | | S6 | S7 | S1 | S2 | S9 | S6 |
| S6$_{k-7}$ → S2$_k$ | (1,1,0,0,x,1,!x,0,0,1,1) | [12A]15A | | | S6 | S8 | S2 | S9 | S6 | S7 |
| | | [12A]15B | | | S6 | S7 | S1 | S2 | S9 | S6 |
| S4$_{k-7}$ → S6$_k$ | (1,1,1,1,x,0,!x,1,1,0,0) | [12A]16A | | | S4 | S4 | S5 | S6 | S8 | S2 |
| | | [12A]16B | | | S4 | S5 | S6 | S8 | S2 | S3 |
| S4$_{k-7}$ → S5$_k$ | (1,1,1,1,x,0,!x,1,1,1,0) | [12A]17A | | | S4 | S4 | S5 | S6 | S8 | S2 |
| | | [12A]17B | | | S4 | S5 | S6 | S8 | S2 | S3 |
| S4$_{k-7}$ → S4$_k$ | (1,1,1,1,x,0,!x,1,1,1,1) | [12A]18A | | | S4 | S4 | S5 | S6 | S8 | S2 |
| | | [12A]18B | | | S4 | S5 | S6 | S8 | S2 | S3 |

| STATE TRANSITION | k − 1 | k | PR EQUALIZATION IDEAL VALUE | | | | | | | EUCLIDEAN DISTANCE DIFFERENCE |
|---|---|---|---|---|---|---|---|---|---|---|
| S0$_{k-7}$ → S0$_k$ | S0 | S0 | 1 | 3 | 4 | 4 | 3 | 1 | 0 | 12 |
| | S7 | S0 | 0 | 1 | 3 | 4 | 4 | 3 | 1 | |
| S0$_{k-7}$ → S1$_k$ | S0 | S1 | 1 | 3 | 4 | 4 | 3 | 1 | 1 | 12 |
| | S7 | S1 | 0 | 1 | 3 | 4 | 4 | 3 | 2 | |
| S0$_{k-7}$ → S2$_k$ | S1 | S2 | 1 | 3 | 4 | 4 | 3 | 2 | 3 | 12 |
| | S8 | S2 | 0 | 1 | 3 | 4 | 4 | 4 | 4 | |
| S2$_{k-7}$ → S6$_k$ | S9 | S6 | 5 | 6 | 5 | 4 | 4 | 4 | 4 | 12 |
| | S5 | S6 | 4 | 4 | 4 | 4 | 5 | 6 | 5 | |
| S2$_{k-7}$ → S5$_k$ | S3 | S5 | 5 | 6 | 5 | 4 | 4 | 5 | 6 | 12 |
| | S4 | S5 | 4 | 4 | 4 | 4 | 5 | 7 | 7 | |
| S2$_{k-7}$ → S4$_k$ | S3 | S4 | 5 | 6 | 5 | 4 | 4 | 5 | 7 | 12 |
| | S4 | S4 | 4 | 4 | 4 | 4 | 5 | 7 | 8 | |
| S3$_{k-7}$ → S6$_k$ | S9 | S6 | 7 | 7 | 5 | 4 | 4 | 4 | 4 | 12 |
| | S5 | S6 | 6 | 5 | 4 | 4 | 5 | 6 | 5 | |

TABLE 2-continued

| | | | | | | | | | | |
|---|---|---|---|---|---|---|---|---|---|---|
| $S3_{k-7} \to S5_k$ | S3 | S5 | 7 | 7 | 5 | 4 | 4 | 5 | 6 | 12 |
| | S4 | S5 | 6 | 5 | 4 | 4 | 5 | 7 | 7 | |
| $S3_{k-7} \to S4_k$ | S3 | S4 | 7 | 7 | 5 | 4 | 4 | 5 | 7 | 12 |
| | S4 | S4 | 6 | 5 | 4 | 4 | 5 | 7 | 8 | |
| $S7_{k-7} \to S0_k$ | S0 | S0 | 2 | 3 | 4 | 4 | 3 | 1 | 0 | 12 |
| | S7 | S0 | 1 | 1 | 3 | 4 | 4 | 3 | 1 | |
| $S7_{k-7} \to S1_k$ | S0 | S1 | 2 | 3 | 4 | 4 | 3 | 1 | 1 | 12 |
| | S7 | S1 | 1 | 1 | 3 | 4 | 4 | 3 | 2 | |
| $S7_{k-7} \to S2_k$ | S1 | S2 | 2 | 3 | 4 | 4 | 3 | 2 | 3 | 12 |
| | S8 | S2 | 1 | 1 | 3 | 4 | 4 | 4 | 4 | |
| $S6_{k-7} \to S0_k$ | S0 | S0 | 4 | 4 | 4 | 4 | 3 | 1 | 0 | 12 |
| | S7 | S0 | 3 | 2 | 3 | 4 | 4 | 3 | 1 | |
| $S6_{k-7} \to S1_k$ | S0 | S1 | 4 | 4 | 4 | 4 | 3 | 1 | 1 | 12 |
| | S7 | S1 | 3 | 2 | 3 | 4 | 4 | 3 | 2 | |
| $S6_{k-7} \to S2_k$ | S1 | S2 | 4 | 4 | 4 | 4 | 3 | 2 | 3 | 12 |
| | S8 | S2 | 3 | 2 | 3 | 4 | 4 | 4 | 4 | |
| $S4_{k-7} \to S6_k$ | S9 | S6 | 8 | 7 | 5 | 4 | 4 | 4 | 4 | 12 |
| | S5 | S6 | 7 | 5 | 4 | 4 | 5 | 6 | 5 | |
| $S4_{k-7} \to S5_k$ | S3 | S5 | 8 | 7 | 5 | 4 | 4 | 5 | 6 | 12 |
| | S4 | S5 | 7 | 5 | 4 | 4 | 5 | 7 | 7 | |
| $S4_{k-7} \to S4_k$ | S3 | S4 | 8 | 7 | 5 | 4 | 4 | 5 | 7 | 12 |
| | S4 | S4 | 7 | 5 | 4 | 4 | 5 | 7 | 8 | |

TABLE 3

| STATE TRANSITION | TRANSITION DATA SEQUENCE $(b_{k-i}, \ldots, b_k)$ | DETECTION PATTERN | k − 9 | k − 8 | k − 7 | k − 6 | k − 5 | k − 4 | k − 3 | k − 2 |
|---|---|---|---|---|---|---|---|---|---|---|
| $S0_{k-9} \to S6_k$ | (0,0,0,0,x,1,!x,0,x,1,1,0,0) | [12B]1A | S0 | S1 | S2 | S9 | S6 | S8 | S2 | S3 |
| | | [12B]1B | S0 | S0 | S1 | S2 | S9 | S6 | S8 | S2 |
| $S0_{k-9} \to S5_k$ | (0,0,0,0,x,1,!x,0,x,1,1,1,0) | [12B]2A | S0 | S1 | S2 | S9 | S6 | S8 | S2 | S3 |
| | | [12B]2B | S0 | S0 | S1 | S2 | S9 | S6 | S8 | S2 |
| $S0_{k-9} \to S4_k$ | (0,0,0,0,x,1,!x,0,x,1,1,1,1) | [12B]3A | S0 | S1 | S2 | S9 | S6 | S8 | S2 | S3 |
| | | [12B]3B | S0 | S0 | S1 | S2 | S9 | S6 | S8 | S2 |
| $S2_{k-9} \to S0_k$ | (0,0,1,1,x,0,!x,1,x,0,0,0,0) | [12B]4A | S2 | S3 | S5 | S6 | S8 | S2 | S9 | S6 |
| | | [12B]4B | S2 | S9 | S6 | S8 | S2 | S9 | S6 | S7 |
| $S2_{k-9} \to S1_k$ | (0,0,1,1,x,0,!x,1,x,0,0,0,1) | [12B]5A | S2 | S3 | S5 | S6 | S8 | S2 | S9 | S6 |
| | | [12B]5B | S2 | S9 | S6 | S8 | S2 | S9 | S6 | S7 |
| $S2_{k-9} \to S2_k$ | (0,0,1,1,x,0,!x,1,x,0,0,1,1) | [12B]6A | S2 | S3 | S5 | S6 | S8 | S2 | S9 | S6 |
| | | [12B]6B | S2 | S9 | S6 | S8 | S2 | S9 | S6 | S7 |
| $S3_{k-9} \to S0_k$ | (0,1,1,1,x,0,!x,1,x,0,0,0,0) | [12B]7A | S3 | S4 | S5 | S6 | S8 | S2 | S9 | S6 |
| | | [12B]7B | S3 | S5 | S6 | S8 | S2 | S9 | S6 | S7 |
| $S3_{k-9} \to S1_k$ | (0,1,1,1,x,0,!x,1,x,0,0,0,1) | [12B]8A | S3 | S4 | S5 | S6 | S8 | S2 | S9 | S6 |
| | | [12B]8B | S3 | S5 | S6 | S8 | S2 | S9 | S6 | S7 |
| $S3_{k-9} \to S2_k$ | (0,1,1,1,x,0,!x,1,x,0,0,1,1) | [12B]9A | S3 | S4 | S5 | S6 | S8 | S2 | S9 | S6 |
| | | [12B]9B | S3 | S5 | S6 | S8 | S2 | S9 | S6 | S7 |
| $S7_{k-9} \to S6_k$ | (1,0,0,0,x,1,!x,0,x,1,1,0,0) | [12B]10A | S7 | S1 | S2 | S9 | S6 | S8 | S2 | S3 |
| | | [12B]10B | S7 | S0 | S1 | S2 | S9 | S6 | S8 | S2 |
| $S7_{k-9} \to S5_k$ | (1,0,0,0,x,1,!x,0,x,1,1,1,0) | [12B]11A | S7 | S1 | S2 | S9 | S6 | S8 | S2 | S3 |
| | | [12B]11B | S7 | S0 | S1 | S2 | S9 | S6 | S8 | S2 |
| $S7_{k-9} \to S4_k$ | (1,0,0,0,x,1,!x,0,x,1,1,1,1) | [12B]12A | S7 | S1 | S2 | S9 | S6 | S8 | S2 | S3 |
| | | [12B]12B | S7 | S0 | S1 | S2 | S9 | S6 | S8 | S2 |
| $S6_{k-9} \to S6_k$ | (1,1,0,0,x,1,!x,0,x,1,1,0,0) | [12B]13A | S6 | S8 | S2 | S9 | S6 | S8 | S2 | S3 |
| | | [12B]13B | S6 | S7 | S1 | S2 | S9 | S6 | S8 | S2 |
| $S6_{k-9} \to S5_k$ | (1,1,0,0,x,1,!x,0,x,1,1,1,0) | [12B]14A | S6 | S8 | S2 | S9 | S6 | S8 | S2 | S3 |
| | | [12B]14B | S6 | S7 | S1 | S2 | S9 | S6 | S8 | S2 |
| $S6_{k-9} \to S4_k$ | (1,1,0,0,x,1,!x,0,x,1,1,1,1) | [12B]15A | S6 | S8 | S2 | S9 | S6 | S8 | S2 | S3 |
| | | [12B]15B | S6 | S7 | S1 | S2 | S9 | S6 | S8 | S2 |
| $S4_{k-9} \to S0_k$ | (1,1,1,1,x,0,!x,1,x,0,0,0,0) | [12B]16A | S4 | S4 | S5 | S6 | S8 | S2 | S9 | S6 |
| | | [12B]16B | S4 | S5 | S6 | S8 | S2 | S9 | S6 | S7 |
| $S4_{k-9} \to S1_k$ | (1,1,1,1,x,0,!x,1,x,0,0,0,1) | [12B]17A | S4 | S4 | S5 | S6 | S8 | S2 | S9 | S6 |
| | | [12B]17B | S4 | S5 | S6 | S8 | S2 | S9 | S6 | S7 |
| $S4_{k-9} \to S2_k$ | (1,1,1,1,x,0,!x,1,x,0,0,1,1) | [12B]18A | S4 | S4 | S5 | S6 | S8 | S2 | S9 | S6 |
| | | [12B]18B | S4 | S5 | S6 | S8 | S2 | S9 | S6 | S7 |

| STATE TRANSITION | k − 1 | k | | | PR EQUALIZATION IDEAL VALUE | | | | | | EUCLIDEAN DISTANCE DIFFERENCE |
|---|---|---|---|---|---|---|---|---|---|---|---|
| $S0_{k-9} \to S6_k$ | S5 | S6 | 1 | 3 | 4 | 4 | 4 | 5 | 6 | 5 | 12 |
| | S9 | S6 | 0 | 1 | 3 | 4 | 4 | 4 | 4 | 4 | |
| $S0_{k-9} \to S5_k$ | S4 | S5 | 1 | 3 | 4 | 4 | 4 | 5 | 7 | 7 | 12 |
| | S3 | S5 | 0 | 1 | 3 | 4 | 4 | 4 | 5 | 6 | |
| $S0_{k-9} \to S4_k$ | S4 | S4 | 1 | 3 | 4 | 4 | 4 | 5 | 7 | 8 | 12 |
| | S3 | S4 | 0 | 1 | 3 | 4 | 4 | 4 | 5 | 7 | |

TABLE 3-continued

| | | | | | | | | | | | |
|---|---|---|---|---|---|---|---|---|---|---|---|
| $S2_{k-9} \to S0_k$ | S7 | S0 | 5 | 6 | 5 | 4 | 4 | 4 | 4 | 3 | 1 | 12 |
| | S0 | S0 | 4 | 4 | 4 | 4 | 4 | 4 | 3 | 1 | 0 | |
| $S2_{k-9} \to S1_k$ | S7 | S1 | 5 | 6 | 5 | 4 | 4 | 4 | 4 | 3 | 2 | 12 |
| | S0 | S1 | 4 | 4 | 4 | 4 | 4 | 4 | 3 | 1 | 1 | |
| $S2_{k-9} \to S2_k$ | S8 | S2 | 5 | 6 | 5 | 4 | 4 | 4 | 4 | 4 | 4 | 12 |
| | S1 | S2 | 4 | 4 | 4 | 4 | 4 | 4 | 3 | 2 | 3 | |
| $S3_{k-9} \to S0_k$ | S7 | S0 | 7 | 7 | 5 | 4 | 4 | 4 | 4 | 3 | 1 | 12 |
| | S0 | S0 | 6 | 5 | 4 | 4 | 4 | 4 | 3 | 1 | 0 | |
| $S3_{k-9} \to S1_k$ | S7 | S1 | 7 | 7 | 5 | 4 | 4 | 4 | 4 | 3 | 2 | 12 |
| | S0 | S1 | 6 | 5 | 4 | 4 | 4 | 4 | 3 | 1 | 1 | |
| $S3_{k-9} \to S2_k$ | S8 | S2 | 7 | 7 | 5 | 4 | 4 | 4 | 4 | 4 | 4 | 12 |
| | S1 | S2 | 6 | 5 | 4 | 4 | 4 | 4 | 3 | 2 | 3 | |
| $S7_{k-9} \to S6_k$ | S5 | S6 | 2 | 3 | 4 | 4 | 4 | 4 | 5 | 6 | 5 | 12 |
| | S9 | S6 | 1 | 1 | 3 | 4 | 4 | 4 | 4 | 4 | 4 | |
| $S7_{k-9} \to S5_k$ | S4 | S5 | 2 | 3 | 4 | 4 | 4 | 4 | 5 | 7 | 7 | 12 |
| | S3 | S5 | 1 | 1 | 3 | 4 | 4 | 4 | 4 | 5 | 6 | |
| $S7_{k-9} \to S4_k$ | S4 | S4 | 2 | 3 | 4 | 4 | 4 | 4 | 5 | 7 | 8 | 12 |
| | S3 | S4 | 1 | 1 | 3 | 4 | 4 | 4 | 4 | 5 | 7 | |
| $S6_{k-9} \to S6_k$ | S5 | S6 | 4 | 4 | 4 | 4 | 4 | 4 | 5 | 6 | 5 | 12 |
| | S9 | S6 | 3 | 2 | 3 | 4 | 4 | 4 | 4 | 4 | 4 | |
| $S6_{k-9} \to S5_k$ | S4 | S5 | 4 | 4 | 4 | 4 | 4 | 4 | 5 | 7 | 7 | 12 |
| | S3 | S5 | 3 | 2 | 3 | 4 | 4 | 4 | 4 | 5 | 6 | |
| $S6_{k-9} \to S4_k$ | S4 | S4 | 4 | 4 | 4 | 4 | 4 | 4 | 5 | 7 | 8 | 12 |
| | S3 | S4 | 3 | 2 | 3 | 4 | 4 | 4 | 4 | 5 | 7 | |
| $S4_{k-9} \to S0_k$ | S7 | S0 | 8 | 7 | 5 | 4 | 4 | 4 | 4 | 3 | 1 | 12 |
| | S0 | S0 | 7 | 5 | 4 | 4 | 4 | 4 | 3 | 1 | 0 | |
| $S4_{k-9} \to S1_k$ | S7 | S1 | 8 | 7 | 5 | 4 | 4 | 4 | 4 | 3 | 2 | 12 |
| | S0 | S1 | 7 | 5 | 4 | 4 | 4 | 4 | 3 | 1 | 1 | |
| $S4_{k-9} \to S2_k$ | S8 | S2 | 8 | 7 | 5 | 4 | 4 | 4 | 4 | 4 | 4 | 12 |
| | S1 | S2 | 7 | 5 | 4 | 4 | 4 | 4 | 3 | 2 | 3 | |

Table 1 corresponds to 1-bit errors, Table 2 corresponds to 2-bit errors, and Table 3 corresponds to 3-bit errors.

In Tables 1 through 3, the first column represents the state transition ($Sm_{k-9} \to Sn_k$) by which two state transitions which are likely to cause an error are branched and rejoin.

The second column represents the transition data sequence ($b_{k-1}, \ldots, b_k$) which causes such two state transitions.

"X" in the transition data sequence represents a bit which is highly likely to cause an error in such data. When the corresponding state transition is determined to be an error, the number of X's (also the number of !X's) is the number of errors.

Among a transition data sequence in which X is 1 and a transition data sequence in which X is 0, one corresponds to a first state transition matrix having the maximum likelihood, and the other corresponds to a second state transition matrix having the second maximum likelihood.

In Tables 2 and 3, "!X" represents an inverted bit of X.

From the demodulated data sequences obtained by demodulation performed by a Viterbi decoding code or the like, the first state transition matrix having the maximum likelihood of causing an error and the second state transition matrix having the second maximum likelihood of causing an error can be extracted by comparing each demodulated data sequence and the transition data sequence (x: Don't care).

The third column represents a detection pattern for each of the first state transition matrix and the second state transition matrix. In Tables 1 through 3, the numerical figure in the brackets "[ ]" represents the Euclidean distance difference between the first state transition matrix and the second state transition matrix. It should be noted that the Euclidean distance difference in Tables 2 and 3 is 12, and so "12A" is provided in Table 2 and "12B" is provided in Table 3 in order to distinguish the tables. The numerical figure outside the brackets "[ ]" is provided to distinguish 18 detection patterns. Letters A and B are provided to distinguish the two state transition matrixes.

The fourth column represents state S at each time.

The fifth column represents two ideal reproduction waveforms (PR equalization ideal values) after the respective state transitions. The sixth column represents the square of the Euclidean distance between the two ideal signals (Euclidean distance difference).

Among state transition patterns of two possible state transitions, Table 1 shows 18 state transition patterns by which the Euclidean distance difference between the two possible state transitions is 14. These patterns correspond to a portion of an optical disc medium at which a recording mark is switched to a space (edge of a reproduction signal).

As an example, state transition paths from S0(k–5) to S6(k) among the state transitions shown in Table 1 will be described. In this case, one path in which the recording sequence is changed as "0,0,0,0,1,1,1,0,0", namely, 4T or longer space-3T mark-2T or longer space is detected. In the reproduction data, "0" represents a space and "1" represents a mark.

Figure 13:
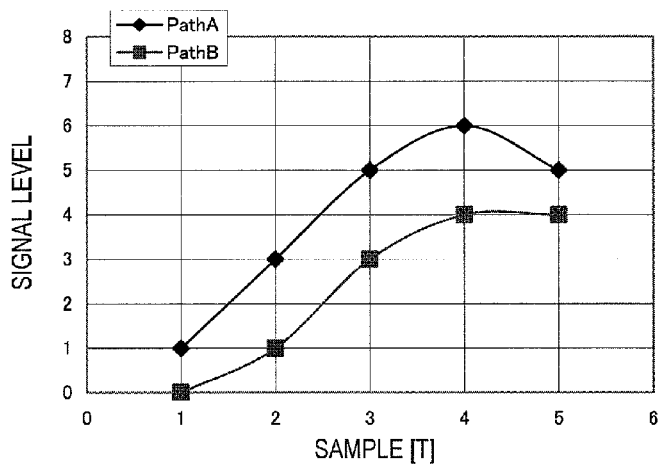
FIG. 13 shows PR equalization ideal waveforms shown in Table 1 according to the embodiment of the present invention.

FIG. 13 shows an example of the PR equalization ideal waveforms of the recording sequence shown in Table 1. In FIG. 13, the PR equalization ideal waveform of the above-mentioned recording sequence is shown as "path A signal waveform".

Figure 14:
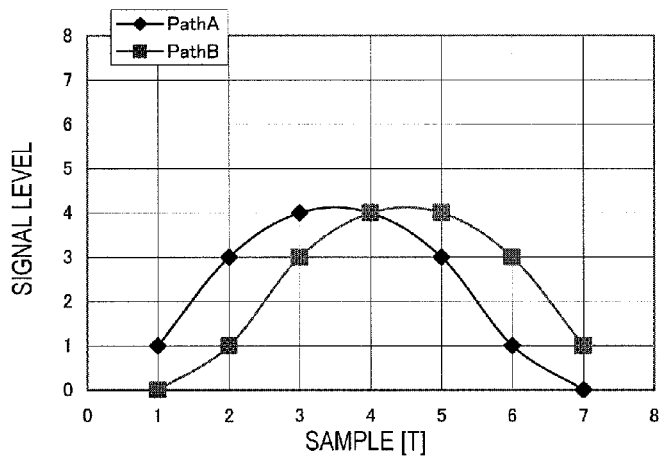
FIG. 14 shows PR equalization ideal waveforms shown in Table 2 according to the embodiment of the present invention.
Figure 15:
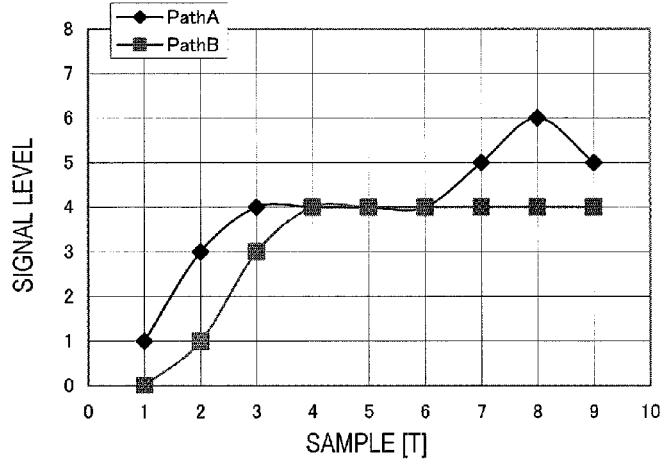
FIG. 15 shows PR equalization ideal waveforms shown in Table 3 according to the embodiment of the present invention.

Similarly, FIG. 14 shows an example of the PR equalization ideal waveforms shown in Table 2. FIG. 15 shows an example of the PR equalization ideal waveforms shown in Table 3.

In FIGS. 13, 14 and 15, the horizontal axis represents the sampling time (sampled at one time unit of the recording sequence), and the vertical axis represents the reproduction signal level.

As described above, in PR(1,2,2,2,1)ML, there are 9 ideal reproduction signal levels (level 0 through level 8).

Regarding the state transition from S0(k–5) to S6(k) shown in Table 1, there is another path in which the recording sequence is changed as "0,0,0,0,0,1,1,0,0". This corresponds to 5T or longer space-2T mark-2T or longer space. In FIG. 13, the PR equalization ideal waveform of this path is shown as "path B signal waveform".

The patterns shown in Table 1 corresponding to the Euclidean distance difference of 14 have a feature of necessarily including one piece of edge information.

Table 2 shows 18 state transition patterns by which the Euclidean distance difference between the two possible state transitions is 12.

These patterns correspond to a shift error of a 2T mark or a 2T space; namely, are 2-bit shift error patterns.

As an example, state transition paths from S0(k−7) to S0(k) among the state transitions shown in Table 2 will be described.

In this case, one path in which the recording sequence is changed as "0,0,0,0,1,1,0,0,0,0,0", namely, 4T or longer space-2T mark-5T or longer space is detected. In FIG. 14, the PR equalization ideal waveform of this path is shown as "path A signal waveform".

There is another path in which the recording sequence is changed as "0,0,0,0,0,1,1,0,0,0,0". This corresponds to 5T or longer space-2T mark-4T or longer space. In FIG. 14, the PR equalization ideal waveform of this path is shown as "path B signal waveform".

The patterns shown in Table 2 corresponding to the Euclidean distance difference of 12 have a feature of necessarily including two pieces of edge information, i.e., one on a 2T rise and the other on a 2T fall.

Table 3 shows 18 state transition patterns by which the Euclidean distance difference between two possible state transitions is 12.

These patterns correspond to a portion at which a 2T mark is continuous to a 2T space; namely, are 3-bit error patterns.

As an example, state transition paths from S0(k−9) to S6(k) among the state transitions shown in Table 3 will be described.

In this case, one path in which the recording sequence is changed as "0,0,0,0,1,1,0,0,1,1,1,0,0", namely, 4T or longer space-2T mark-2T space-3T mark-2T or longer space is detected. In FIG. 15, the PR equalization ideal waveform of this path is shown as "path A signal waveform".

There is another path in which the recording sequence is changed as "0,0,0,0,0,1,1,0,0,1,1,0,0", namely, 5T or longer space-2T mark-2T space-2T mark-2T or longer space is detected. In FIG. 15, the PR equalization ideal waveform of this path is shown as "path B signal waveform".

The patterns shown in Table 3 corresponding to the Euclidean distance difference of 12 have a feature of including at least three pieces of edge information.

According to the recording adjustment in this embodiment, first, the recording conditions for 2T marks in the SM group and the MS group are respectively adjusted, and then, the recording conditions for the 2T mark in the SMS group are adjusted based on the recording adjustment results of the SM group and the MS group. A reason for this is that there is not much edge shift information, which can be directly detected, on the leading edge and the trailing edge of the 2T marks in the SMS group. The SMS group includes a 2T-continuous pattern as in the SM group and the MS group.

Accordingly, in this embodiment, detection for the SM group and the MS group is performed.

Now, patterns which are likely to cause an error regarding the length and the phase shift of a 2T mark in a 2T-continuous pattern will be described.

Figure 16:
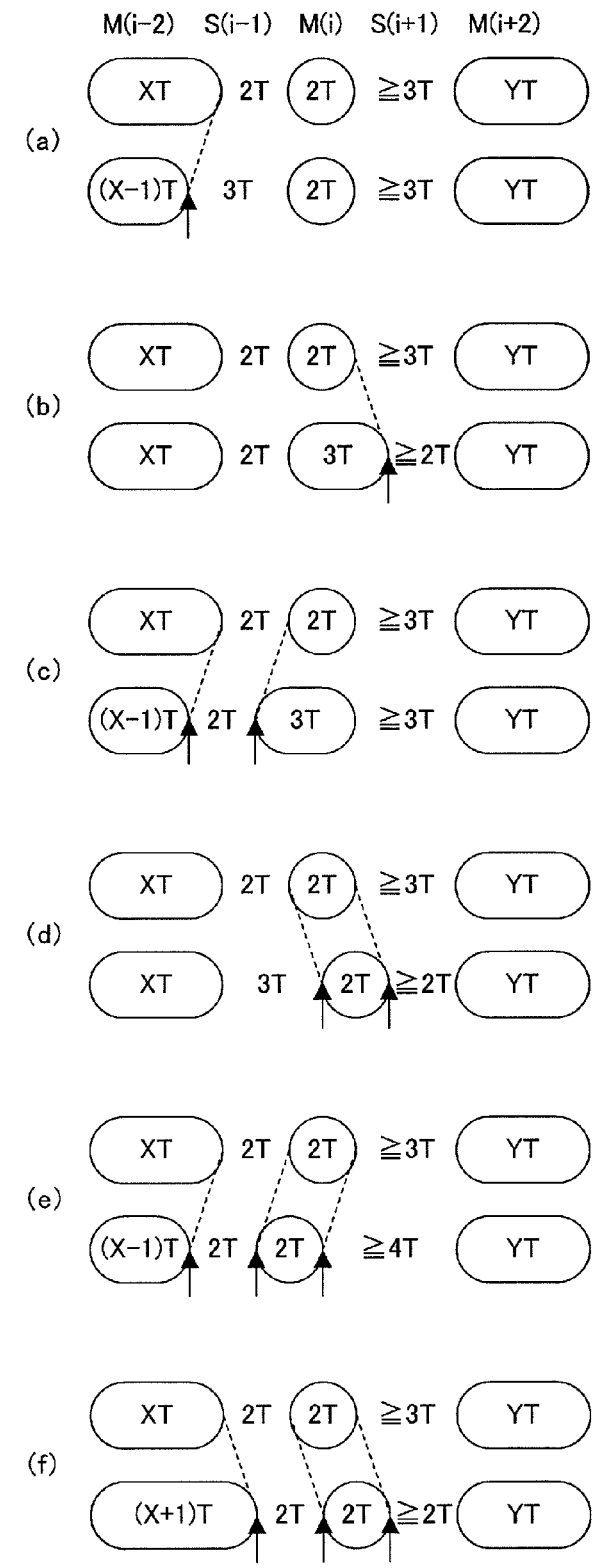
FIGS. 16(a) through (f) each illustrate an error pattern which is likely to occur when a 2T mark of an SM group is changed according to the embodiment of the present invention.
Figure 17:
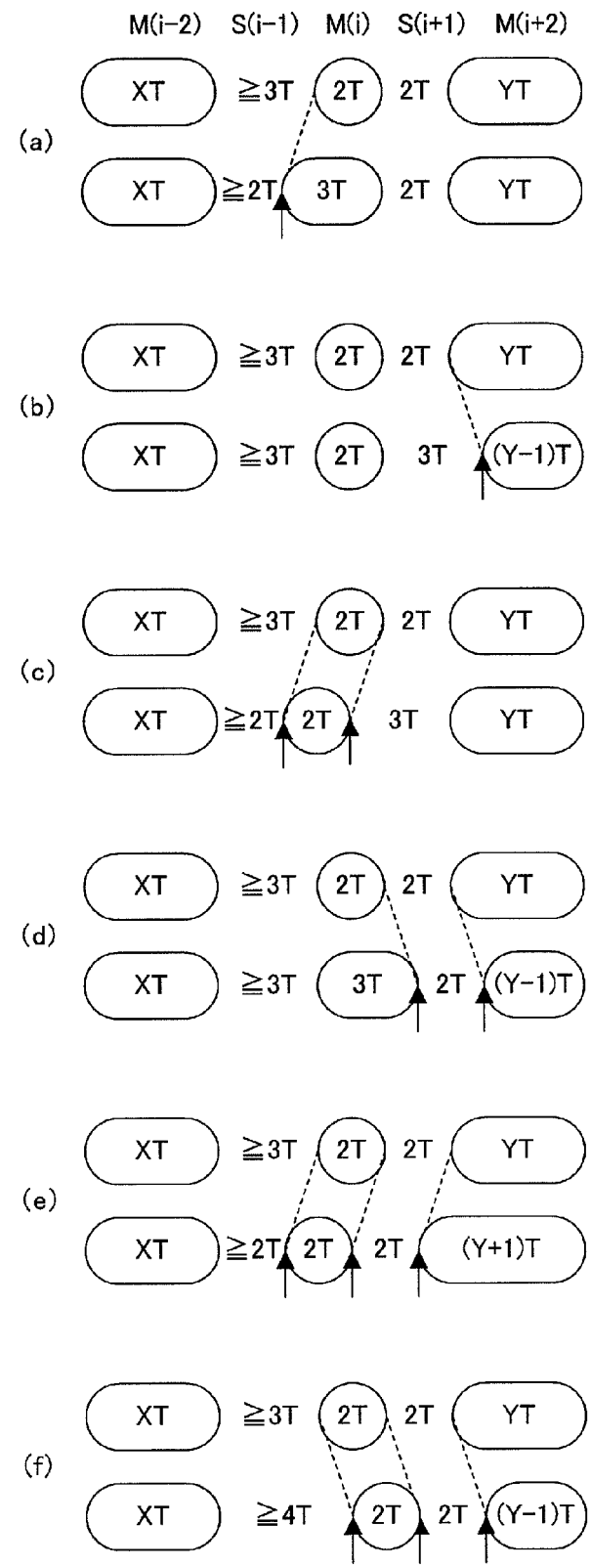
FIGS. 17(a) through (f) each illustrate an error pattern which is likely to occur when a 2T mark of an MS group is changed according to the embodiment of the present invention.

FIG. 16 shows error patterns which are likely to occur when the 2T mark in the SM group is changed. FIG. 17 shows error patterns which are likely to occur when the 2T mark in the MS group is changed.

FIG. 16(a) shows an error pattern by which when the 2T mark in the SM group is changed, the trailing edge of the mark before the previous space is shifted by 1 bit (arrow in the figure) by the influence of the thermal interference. In this case, X represents an integer of 3 or greater. The error in FIG. 16(a) is a 1-bit error and so is detected by the state transition matrix patterns shown in Table 1.

FIG. 16(b) shows an error pattern by which when the 2T mark in the SM group is changed, the trailing edge of the 2T mark is shifted by 1 bit (arrow in the figure). The error in FIG. 16(b) is a 1-bit error and so is detected by the state transition matrix patterns shown in Table 1.

FIG. 16(c) shows an error pattern by which when the 2T mark in the SM group is changed, the 2T space before the 2T mark is shifted forward by 1 bit (arrow in the figure). In this case, X represents an integer of 3 or greater. The error in FIG. 16(c) is a 2-bit error and so is detected by the state transition matrix patterns shown in Table 2.

FIG. 16(d) shows an error pattern by which when the 2T mark in the SM group is changed, the 2T mark is shifted rearward by 1 bit (arrow in the figure). The error in FIG. 16(d) is a 2-bit error and so is detected by the state transition matrix patterns shown in Table 2.

FIG. 16(e) shows an error pattern by which when the 2T mark in the SM group is changed, the 2T mark and the 2T previous space are shifted forward by 1 bit (arrow in the figure). In this case, X represents an integer of 3 or greater. The error in FIG. 16(e) is a 3-bit error and so is detected by the state transition matrix patterns shown in Table 3.

FIG. 16(f) shows an error pattern by which when the 2T mark in the SM group is changed, the 2T mark and the 2T previous space are shifted rearward by 1 bit (arrow in the figure). The error in FIG. 16(f) is a 3-bit error and so is detected by the state transition matrix patterns shown in Table 3.

FIG. 17 can be explained in substantially the same manner as FIG. 16.

FIG. 17(a) shows an error pattern by which when the 2T mark in the MS group is changed, the leading edge of the 2T mark is shifted by 1 bit (arrow in the figure). The error in FIG. 17(a) is a 1-bit error and so is detected by the state transition matrix patterns shown in Table 1.

FIG. 17(b) shows an error pattern by which when the 2T mark in the MS group is changed, the leading edge of the mark after the subsequent space is shifted by 1 bit (arrow in the figure) by the influence of the thermal interference. In this case, Y represents an integer of 3 or greater. The error in FIG. 17(b) is a 1-bit error and so is detected by the state transition matrix patterns shown in Table 1.

FIG. 17(c) shows an error pattern by which when the 2T mark in the MS group is changed, the 2T mark is shifted forward by 1 bit (arrow in the figure). The error in FIG. 17(c) is a 2-bit error and so is detected by the state transition matrix patterns shown in Table 2.

FIG. 17(d) shows an error pattern by which when the 2T mark in the SM group is changed, the 2T subsequent space is shifted rearward by 1 bit (arrow in the figure). In this case, Y represents an integer of 3 or greater. The error in FIG. 17(d) is a 2-bit error and so is detected by the state transition matrix patterns shown in Table 2.

FIG. 17(e) shows an error pattern by which when the 2T mark in the MS group is changed, the 2T mark and the 2T subsequent space are shifted forward by 1 bit (arrow in the figure). The error in FIG. 17(e) is a 3-bit error and so is detected by the state transition matrix patterns shown in Table 3.

FIG. 17(f) shows an error pattern by which when the 2T mark in the MS group is changed, the 2T mark and the 2T subsequent space are shifted rearward by 1 bit (arrow in the figure). In this case, Y represents an integer of 3 or greater. The error in FIG. 17(f) is a 3-bit error and so is detected by the state transition matrix patterns shown in Table 3.

Tables 1, 2 and 3 above show the detection patterns provided by focusing on the patterns of PR(1,2,2,2,1)ML which are especially likely to cause an error. In the recording adjustment in this embodiment on 2T-continuous patterns, it is not necessary to use all the detection patters shown in Tables 1, 2 and 3.

Therefore, regarding the error patterns in FIG. 16, the shift of the average value of the pattern distribution (pattern shift) in each group is detected by the following detection patterns:

The error pattern in FIG. 16(a) is detected by the detection patterns of [14]6A, [14]9A, and [14]18A in Table 1.

The error pattern in FIG. 16(b) is detected by the detection patterns of [14]4B, [14]5B, and [14]6B in Table 1.

The error pattern in FIG. 16(c) is detected by the detection patterns of [12A]4A, [12A]7A, and [12A]16A in Table 2.

The error pattern in FIG. 16(d) is detected by the detection patterns of [12A]13A, [12A]14A, and [12A]15A in Table 2.

The error pattern in FIG. 16(e) is detected by the detection patterns of [12B]4A, [12B]5A, [12B]7A, [12B]8A, [12B]16A, and [12B]17A in Table 3.

The error pattern in FIG. 16(f) is detected by the detection patterns of [12B]4B, [12B]5B, [12B]6B, [12B]7B, [12B]8B, [12B]9B, [12B]16B, [12B]17B, and [12B]18B in Table 3.

Similarly, regarding the error patterns in FIG. 17, the shift of the average value of the pattern distribution (pattern shift) in each group is detected by the following detection patterns:

The error pattern in FIG. 17(a) is detected by the detection patterns of [14]1B, [14]10B, and [14]13B in Table 1.

The error pattern in FIG. 17(b) is detected by the detection patterns of [14]13A, [14]14A, and [14]15A in Table 1.

The error pattern in FIG. 17(c) is detected by the detection patterns of [12A]3B, [12A]12B, and [12A]15B in Table 2.

The error pattern in FIG. 17(d) is detected by the detection patterns of [12A]4B, [12A]5B, and [12A]6B in Table 2.

The error pattern in FIG. 17(e) is detected by the detection patterns of [12B]1B, [12B]2B, [12B]3B, [12B]10B, [12B]11B, [12B]12B, [12B]13B, [12B]14B, and [12B]15B in Table 3.

The error pattern in FIG. 17(f) is detected by the detection patterns of [12B]1A, [12B]2A, [12B]3A, [12B]10A, [12B]11A, and [12B]12A in Table 3.

As can be seen from the above, the SM pattern and the MS pattern are different merely in the order of the recording marks and spaces. Therefore, for the SM pattern and the MS pattern, the Euclidean distance and the number of error bits for binary data (correct pattern), which is the decoding result on the reproduction signal, are the same and the number of error patterns to be detected is the same. This embodiment is not limited to this, and pattern shifts with a different Euclidean distance or a different number of error patterns may be detected.

In this embodiment, where the reproduction signal is represented by S, the signal of the correct pattern is represented by T, the signal of an error pattern in which the target edge in the binary data is shifted forward by 1 bit is represented by L, and the signal of an error pattern in which the target edge in the binary data is shifted rearward by 1 bit is represented by R, the Euclidean distance difference between the signal of the correct pattern and the reproduction signal is D(T,S);

the Euclidean distance difference between the signal of the error pattern in which the target edge is shifted forward by 1 bit and the reproduction signal is D(L,S);

the Euclidean distance difference between the signal of the error pattern in which the target edge is shifted rearward by 1 bit and the reproduction signal is D(R,S);

the Euclidean distance difference between the signal of the correct pattern and the signal of the error pattern in which the target edge is shifted forward by 1 bit is D(T,L); and the Euclidean distance difference between the signal of the correct pattern and the signal of the error pattern in which the target edge is shifted rearward by 1 bit is D(T,R).

In this case, pattern shift PS1 relating to the error pattern in which the target edge is shifted forward by 1 bit is calculated by the following expression.

$$PS1 = \frac{D(L, S) - D(T, S) - D(L, T)}{2 \times D(L, T)} \quad \text{(expression 2)}$$

Pattern shift PS2 relating to the error pattern in which the target edge is shifted rearward by 1 bit is calculated by the following expression.

$$PS2 = \frac{D(R, S) - D(T, S) - D(R, T)}{2 \times D(R, T)} \quad \text{(expression 3)}$$

For the reproduction signal, the target edge is detected a plurality of times. Therefore, the detection precision of the pattern shifts PS1 and PS2 can be improved by averaging the accumulated results obtained by detecting pattern shifts PS1 and PS2 a plurality of times.

Each of the pattern shifts in the SM group shown in FIG. 16 is calculated by expression 2 or 3.

Where the pattern shift in FIG. 16(a) is PXM2S, PXM2S is calculated by expression 2.

Where the pattern shift in FIG. 16(b) is P2MXS, P2MXS is calculated by expression 3.

Where the pattern shift in FIG. 16(c) is ASM_L, ASM_L is calculated by expression 2.

Where the pattern shift in FIG. 16(d) is ASM_R, ASM_R is calculated by expression 3.

Where the pattern shift in FIG. 16(e) is BSM_L, BSM_L is calculated by expression 2.

Where the pattern shift in FIG. 16(f) is BSM_R, BSM_R is calculated by expression 3.

Similarly, each of the pattern shifts in the MS group shown in FIG. 17 is calculated by expression 2 or 3.

Where the pattern shift in FIG. 17(a) is PXS2M, PXS2M is calculated by expression 2.

Where the pattern shift in FIG. 17(b) is P2SXM, P2SXM is calculated by expression 3.

Where the pattern shift in FIG. 17(c) is AMS_L, AMS_L is calculated by expression 2.

Where the pattern shift in FIG. 17(d) is AMS_R, AMS_R is calculated by expression 3.

Where the pattern shift in FIG. 17(e) is BMS_L, BMS_L is calculated by expression 2.

Where the pattern shift in FIG. 17(f) is BMS_R, BMS_R is calculated by expression 3.

In this embodiment, length error Lsm and phase error Psm of a 2T mark in the SM group are detected using each of the pattern shifts shown in FIG. 16 and are calculated by the following expressions.

$$Lsm = a1 \times \frac{PXM2S - P2MXS}{2} + \qquad \text{(expression 4)}$$
$$b1 \times \frac{ASM\_R - ASM\_L}{2} + c1 \times \frac{BSM\_R - BSM\_L}{2}$$

$$Psm = a2 \times \frac{PXM2S + P2MXS}{2} + \qquad \text{(expression 5)}$$
$$b2 \times \frac{ASM\_R - ASM\_L}{2} + c2 \times \frac{BSM\_R - BSM\_L}{2}$$

Coefficients a1, b1, c1, a2, b2 and c2 are real numbers. The coefficients are each used as a code for performing addition or subtraction with each of the components or for performing weighting on each of the components.

In each of expressions 4 and 5, the second term and the third term are average values of the components of the same Euclidean distance difference.

Namely, the second term and the third term each represent an average position of a component shifted forward by 1 bit and a component shifted rearward by 1 bit.

In this manner, in order to solve the above-described problem, the shift of the average value of the pattern distribution of the Euclidean distance difference caused by reproduction noise can be suppressed.

Therefore, for calculating the length error and the phase error, the second term and the third term are the same with each other. Alternatively, coefficients b1 and b2 or coefficients c1 and c2 may be different from each other.

The pattern shifts in expressions 4 and 5 are respectively normalized with the Euclidean distance difference in expressions 2 and 3. Therefore, the calculation of expressions 4 and 5 can be made on the terms for which the Euclidean distance difference is different.

In this embodiment, the Euclidean distance difference is different between the first term and the other terms (the second term and the third term).

Now, the difference in the sign in the first term for calculating the length error and the phase error will be described.

Figure 18:
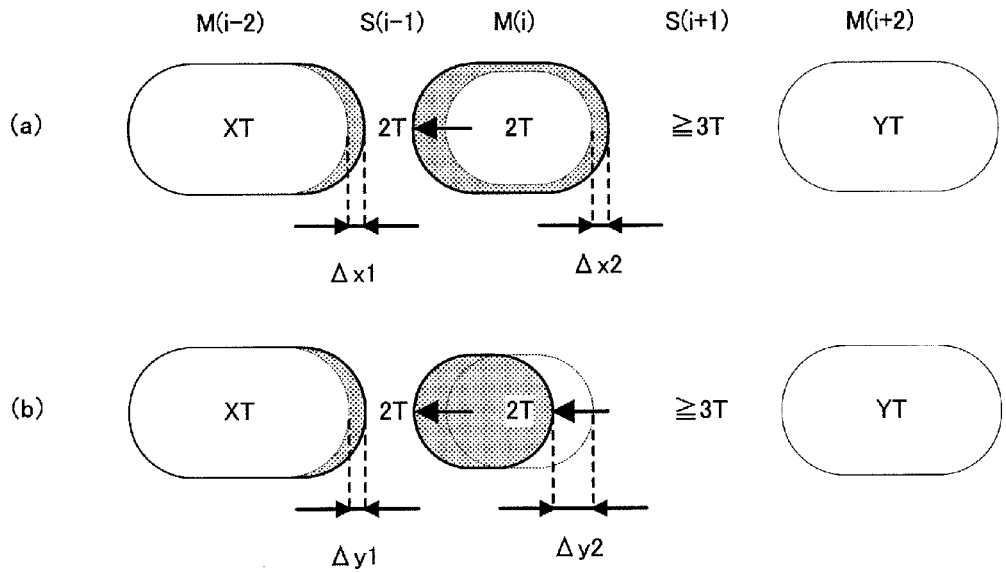
FIGS. 18(a) and (b) illustrate a length change and a phase change of a 2T mark of the SM group according to the embodiment of the present invention.

FIG. 18 shows a length change and a phase change of a 2T mark in the SM group.

FIG. 18(a) shows a change of the mark which occurs when the leading edge of the 2T mark is changed such that the 2T mark becomes longer.

FIG. 18(b) shows a change of the mark which occurs when the phase of the 2T mark is shifted forward by shifting the leading and trailing edges of the 2T mark.

In FIG. 18(a), when the leading edge of the 2T mark is changed, the leading edge and the trailing edge of the 2T mark and also the trailing edge of the recording mark before the previous space are changed. In this case, the change amount of the trailing edge of the recording mark before the previous space is represented by Δx1, and the change amount of the trailing edge of the 2T mark is represented by Δx2.

In FIG. 18(b), when the leading edge and the trailing edge of the 2T mark are changed made in the same direction, the leading edge and the trailing edge of the 2T mark and also the trailing edge of the recording mark before the previous space are changed. In this case, the change amount of the trailing edge of the recording mark before the previous space is represented by Δy1, and the change amount of the trailing edge of the 2T mark is represented by Δy2.

The change amounts Δx1, Δx2 and Δy1 are caused under the influence of the thermal interference by the change of the other mark edges. Therefore, each of the change amounts is smaller than the change amount of the other mark edges.

In FIG. 18(a) and FIG. 18(b), the leading edge of the 2T mark is changed forward. Therefore, the change amounts Δx1 and Δy1 of the trailing edge of the recording mark before the previous space are amounts of change made in the same direction. In the case of FIG. 18, Δx1 and Δy1 are amounts of rearward change. However, the trailing edge of the 2T mark is changed in the opposite direction depending on the length change and the phase change of the 2T mark. In the case of FIG. 18, Δx2 is an amount of rearward change and Δy2 is an amount of forward change. In this manner, there are amounts of change made in the same direction and the amounts of change made in the opposite directions, depending on the length change and the phase change.

Accordingly, between the first terms in expressions 4 and 5, the sign of PXM2S is the same and the sign of the P2MXS is different.

Similarly, in this embodiment, length error Lms and phase error Pms of a 2T mark in the MS group are detected using each of the pattern shifts shown in FIG. 17 and are calculated by the following expressions.

$$Lms = a3 \times \frac{P2SXM - PXS2M}{2} + \qquad \text{(expression 6)}$$
$$b3 \times \frac{AMS\_R - AMS\_L}{2} + c3 \times \frac{MBS\_R - BMS\_L}{2}$$

$$Pms = a4 \times \frac{P2SXM + PXS2M}{2} + \qquad \text{(expression 7)}$$
$$b4 \times \frac{AMS\_R - AMS\_L}{2} + c4 \times \frac{BMS\_R - BMS\_L}{2}$$

Coefficients a3, b3, c3, a4, b4 and c4 are real numbers. The coefficients are each used as a code for performing addition or subtraction with each of the components or for performing weighting on each of the components.

In this manner, recording adjustment on the 2T marks in the SM group and the MS group can be performed by detecting the length error and the phase error.

The 2T mark in the SMS group merely needs to reflect the adjustment result on each of the SM group and the MS group. For example, the recording condition on the 2T mark in the SMS group (for example, dTtop) is set to an average value of the recording condition on the 2T mark in the SM group and the recording condition on the 2T mark in the MS group. Alternatively, when the adjustment result on the SM group (change amount of the recording condition) and the adjustment result on the MS group (change amount of the recording condition) with respect to the initial recording condition are used, the recording condition on the 2T mark in the SMS group may be obtained by adding the average value of the change amounts to the initial condition. For reflecting the adjustment result, the recording condition may be reflected after the length is adjusted and also after the phase is adjusted, or may be reflected after the length and the phase are adjusted at the same time.

In FIG. 16 and FIG. 17 in this embodiment, the bit sequences of the correct patterns are detected as follows.

The correct pattern in FIGS. 16(a), (c) and (e) is bit sequence "1110011000".

The correct pattern in FIGS. 16(b), (d) and (f) is bit sequence "110011000".

The correct pattern in FIGS. 17(a), (c) and (e) is bit sequence "000110011".

The correct pattern in FIGS. 17(b), (d) and (f) is bit sequence "0001100111".

The bit sequences of the correct patterns may be detected as follows when the bits of the error patterns with respect to the correct patterns are changed.

The correct pattern in FIGS. 16(a) and (c) is bit sequence "111001".

The correct pattern in FIGS. 16(b) and (d) is bit sequence "011000".

The correct pattern in FIGS. 17(a) and (c) is bit sequence "000110".

The correct pattern in FIGS. 17(b) and (d) is bit sequence "100111".

This can reduce the circuit scale for the detected bits. In this case, the bit sequences of the correct patterns are of detection patterns including bit sequences which are not 2T-continuous patterns. This occurs when, for example, bit sequence "111001" is a part of bit sequence "11100111". For this reason, it is desirable that the recording signal used for recording adjustment is set so as to necessarily include a continuous sequence of a 2T mark and a 2T space, so that the bit sequences of the correct patterns are replaced.

In order to match the correct pattern in FIG. 16(d) to the correct pattern in FIG. 16(c) corresponding to the same Euclidean distance difference, bit sequence "110011000" in the correct pattern in FIG. 16(d) may be changed to bit sequence "1110011000". Similarly, in order to match the correct pattern in FIG. 17(c) to the correct pattern in FIG. 17(d) corresponding to the same Euclidean distance difference, bit sequence "000110011" in the correct pattern in FIG. 17(c) may be changed to bit sequence "0001100111".

In order to match the correct pattern in FIG. 16(f) to the correct pattern in FIG. 16(e) corresponding to the same Euclidean distance difference, bit sequence "110011000" in the correct pattern in FIG. 16(f) may be changed to bit sequence "1110011000". Similarly, in order to match the correct pattern in FIG. 17(e) to the correct pattern in FIG. 17(f) corresponding to the same Euclidean distance difference, bit sequence "000110011" in the correct pattern in FIG. 17(e) may be changed to bit sequence "0001100111".

In this case, the detection patterns for FIG. 16(f) are [12B]7B, [12B]8B, [12B]9B, [12B]16B, [12B]17B, and [12B]18B in Table 3. The detection patterns for FIG. 17(e) are [12B]1A, [12B]2A, [12B]3A, [12B]10A, [123]11A, and [12B]12A in Table 3.

Owing to this, a signal of a high frequency component in which three or more 2T mark(s)space(s) are continuous with no signal amplitude can be removed. Thus, the shift with respect to the signals of the SM pattern and the MS pattern can be detected more precisely.

Now, an information recording/reading apparatus in an embodiment according to the present invention will be described. FIG. 1 shows an information recording/reading apparatus 100 in the embodiment according to the present invention.

The information recording/reading apparatus 100 includes a reading section 101, a recording adjustment section 102, and a recording section 103.

The reading section 101 includes a preamplifier section 3, an AGC section 4, a waveform equalization section 5, an A/D conversion section 6, and a PLL section 7.

The recording adjustment section 102 includes a PR equalization section 8, a maximum likelihood decoding section 9, a pattern shift detection section 10, and a control section 15. The control section 15 includes an evaluation index calculation section 16.

The recording section 103 includes an optical head 2, a recording pattern generation section 11, a recording compensation section 12, a laser driving section 13, and a laser power setting section 14.

On the information recording/reading apparatus 100, an information recording medium 1 is mountable. The information recording medium 1 is an information recording medium on and from information is optically recorded or reproduced, and is an optical disc, for example.

The optical head 2 converges laser light which has passed an objective lens on a recording layer of the information recording medium 1 and receives the light reflected by the information recording medium 1, and thus generates an analog reproduction signal representing information recorded on the information recording medium 1. The numerical aperture NA of the objective lens is, for example, 0.84 to 0.86 and is preferably 0.85. The wavelength of the laser light is, for example, 400 to 410 nm and is preferably 405 nm.

The preamplifier section 3 amplifies the analog reproduction signal at a prescribed gain and outputs the resultant analog reproduction signal to the AGC section 4.

The AGC section 4 amplifies the reproduction signal output from the A/D conversion section 6 using a preset target gain such that the reproduction signal has a certain level, and outputs the resultant reproduction signal to the waveform equalization section 5.

The equalization section 5 has an LPF characteristic of shielding a high frequency range of the reproduction signal and a filtering characteristic of amplifying a prescribed frequency band of the reproduction signal, and shapes the waveform of the reproduction signal such that the reproduction signal has a desirable characteristic, and outputs the resultant reproduction signal to the A/D conversion section 6.

The PLL section 7 generates a reproduction clock synchronized with the waveform-equalized reproduction signal and outputs the reproduction clock to the A/D conversion section 6.

The A/D conversion section 6 performs sampling of the reproduction signal in synchronization with the reproduction clock output from the PLL section 7 to convert the analog reproduction signal into a digital reproduction signal, and outputs the digital reproduction signal to the PR equalization section 8, the PLL section 7 and the AGC section 4.

The digital reading section generated by the sampling performed by the A/D conversion section 6 is input to the PR equalization section 8. The PR equalization section 8 adjusts the frequency of the digital reproduction signal such that the frequency characteristic of the digital reproduction signal at the time of recording and reproduction is the characteristic assumed by the maximum likelihood decoding section 9 (for example, PR(1,2,2,2,1) equalization characteristic). The maximum likelihood decoding section 9 performs maximum likelihood decoding on the waveform-shaped digital reproduction signal which is output from the PR equalization section 8, and generates a binary signal. The maximum likelihood decoding section 9 is, for example, a Viterbi decoding signal. A reproduction signal processing technology obtained by combining the PR equalization section 8 and the maximum likelihood decoding section 9 is the PRML method.

The pattern shift detection section 10 receives the waveform-shaped digital reproduction signal output from the PR equalization section 8 and the binary signal output from the maximum likelihood decoding section 9. The pattern shift detection section 10 identifies the state transition from the binary signal and finds a pattern shift from the identification result and the branch metric. At this point, the pattern shift detection section 10 detects the pattern shift based on the binary signal in accordance with the detection patterns shown in Tables 1 through 3.

The control section 15 controls various sections of the recording/reading apparatus including the reading section 101, the recording adjustment section 102, the recording section 103, a servo control section (not shown), and the like in order to adjust the recording pulse conditions. The control section 15 also controls an operation of selecting a recording pattern and a recording/reading operation at the time of adjusting the recording pulse condition.

The control section 15 controls the recording section 103 such that a recording signal including at least one recording mark having a length equal to or longer than the optical diffraction limit is recorded on the information recording medium under the optical conditions of the optical head 2 (wavelength of the laser light, NA). For example, under preferable optical conditions of the optical head 2, the total length of the shortest mark and the shortest space is shorter than 238.2 nm.

The control section 15 sets an optimum equalization characteristic (for example, PR(1,2,2,2,1) equalization characteristic) in accordance with the set length of the recording mark on the PR equalization section 8.

The control section 15 receives the pattern shifts, in accordance with the detection patterns, which are output from the pattern shift detection section 10 and separates the pattern shifts into pattern shifts for the SM group and the pattern shifts of the MS group. Based on the pattern shifts corresponding to each group, the evaluation index calculation section 16 calculates an evaluation index value of the length error or the phase error. The evaluation index calculation section 16 calculates the evaluation index value using pattern shifts corresponding to different Euclidean distance differences. As the evaluation index value, the length error and the phase error of the SM group are calculated by expressions 4 and 5, respectively. The length error and the phase error of the MS group are calculated by expression 6 and 7, respectively.

The control section 15 performs recording and reproduction of a recording signal on or from the information recording medium under a plurality of recording conditions. In addition, the control section 15 compares an evaluation index value measured on each recording condition against a target index value stored inside the control section 15, and determines the recording condition corresponding to the evaluation index value closest to the target index value. The target index value is, for example, 0. In this case, the evaluation index value itself is an adjustment error. Therefore, the control section 15 adjusts the recording condition to have an adjustment error of closest to 0 or to have an adjustment error of the minimum absolute value. The control section 15 is, for example, an optical disc controller.

The recording pattern generation section 11 generates an NRZI signal, usable as a recording pattern, from input recording data. The recording compensation section 12 generates a recording pulse train in accordance with the NRZI signal based on the recording parameter changed by the control section 15. The laser power setting section 14 sets recording powers including the peak power Pp, the bottom power Pb and the like. The laser driving section 13 controls a laser light emitting operation of the optical head 2 in accordance with the recording pulse train and the recording powers set by the laser power setting section 14.

The operation of the information recording/reading apparatus 100 will be further described.

Figure 19:
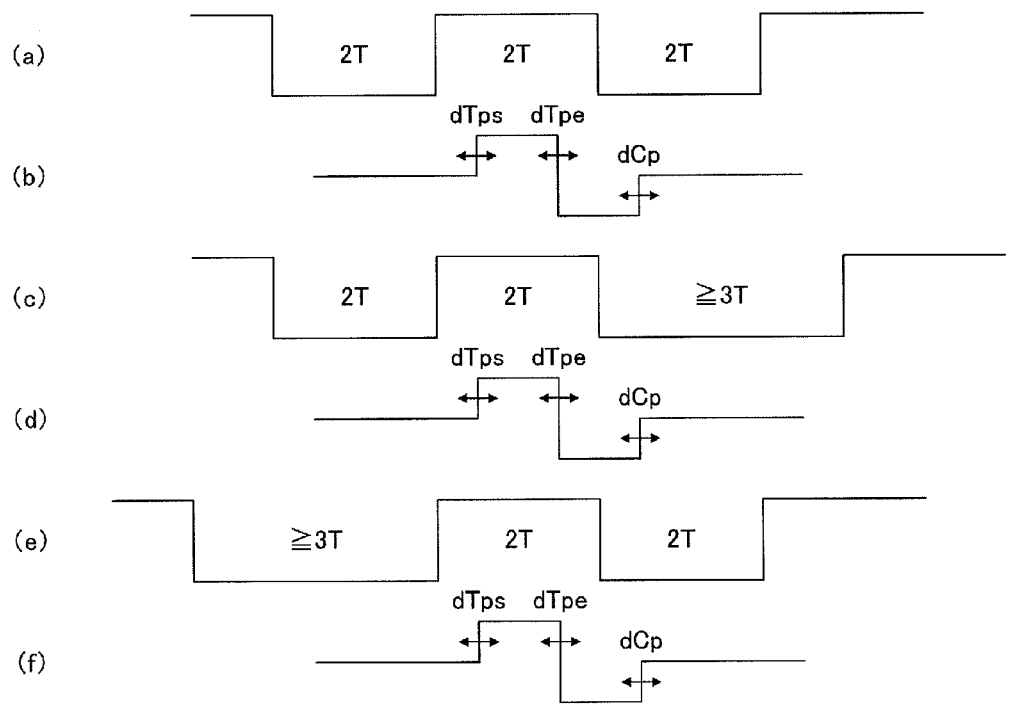
FIGS. 19(a) through (f) illustrate recording pulses on which recording adjustment is to be performed according to the embodiment of the present invention.

FIG. 19 shows recording pulses on which recording adjustment is performed in this embodiment.

FIG. 19(*a*) shows an NRZI signal of pattern 2Ts2Tm 2Ts; and FIG. 19(*b*) shows a recording pulse for the NRZI signal of pattern 2Ts 2Tm 2Ts.

FIG. 19(*c*) shows an NRZI signal of pattern 2Ts 2Tm ≧ 3Ts; and FIG. 19(*d*) shows a recording pulse for the NRZI signal of pattern 2Ts 2Tm ≧3Ts.

FIG. 19(*e*) shows an NRZI signal of pattern ≧3Ts 2Tm 2Ts; and FIG. 19(*f*) shows a recording pulse for the NRZI signal of pattern ≧3Ts 2Tm 2Ts.

The recording mark on which the recording parameters are to be set is a 2T mark. FIG. 19(*b*) shows the recording pulse of the SMS group, FIG. 19(*d*) shows the recording pulse of the SM group, and FIG. 19(*f*) shows the recording pulse of the MS group.

In FIG. 19, dTps and dTpe represent recording parameters for the leading edge of the recording mark, and dCp represents a recording parameter for the trailing edge of the recording mark.

The leading edge is adjusted to be at an appropriate edge position by the recording parameters of the rising edge position dTps of a leading pulse and the falling edge position dTpe of the leading pulse. In this case, the pattern table in FIG. 9 includes two tables, i.e., one for dTps and the other for dTpe. The trailing edge is adjusted to be at an appropriate edge position by the recording parameter of the recording termination position offset dCp.

In this case, the pattern table in FIG. 9 includes the table for dCp.

The relationship between the recording pulses in FIG. 19 and the recording parameter settings in FIG. 9 is as follows. For the recording pulse of the SMS group, the recording parameters dTps and dTpe for the leading edge correspond to 2Ts2Tm2Ts in FIG. 9(*a*), and the recording parameter dCp for the trailing edge corresponds to 2Ts2Tm2Ts in FIG. 9(*b*). For the recording pulse of the SM group, the recording parameters dTps and dTpe for the leading edge correspond to 2Ts2Tm!2Ts in FIG. 9(*a*), and the recording parameter dCp for the trailing edge corresponds to 2Ts2Tm3Ts, 2Ts2Tm4Ts, and 2Ts2Tm5Ts in FIG. 9(*b*). For the recording pulse of the MS group, the recording parameters dTps and dTpe for the leading edge correspond to 3Ts2Tm2Ts, 4Ts2Tm2Ts, and 5Ts2Tm2Ts in FIG. 9(*a*), and the recording parameter dCp for the trailing edge corresponds to !2Ts2Tm2Ts in FIG. 9(*b*).

For the trailing edge of the recording pulse of the SM group and the leading edge of the recording pulse of the MS group, a plurality of recording parameters are targets of adjustment. Therefore, in this embodiment, the recording parameters in each group (dTps, dTpe, dCp) are used as being offset in the same direction with respect to the initial recording pulse condition at the leading edge or the trailing edge. Alternatively, the recording parameters may be offset within each group in accordance with the length of the previous or subsequent space. Each recording parameter may be replaced with a set value such as dTtop or Ttop instead of being offset.

According to the length adjustment in this embodiment, in the SM group, dTps (2T-continuous pattern) is changed; and in the MS group, dTpe and dTps (2T-continuous pattern) are changed in the same direction. According to the phase adjustment, the recording parameters in each of the SM group and the MS group are changed in the same direction.

According to the length adjustment, an edge of the shortest space (2T-continuous pattern) which is significantly influenced by the thermal interference, not an edge including a long space, is changed, so that the recording adjustment can be performed with high precision. Alternatively, an edge of a 2T-continuous pattern and an edge including a long space, namely, a leading edge and a trailing edge may be changed at the same time. In this case, the recording parameter of the leading edge (dTps) and the recording parameters of the trailing edge (dTpe and dCp) are changed in the opposite directions. In order to change the size of the recording mark, the recording power Pp on only the shortest mark may be changed in each group.

Figure 20:
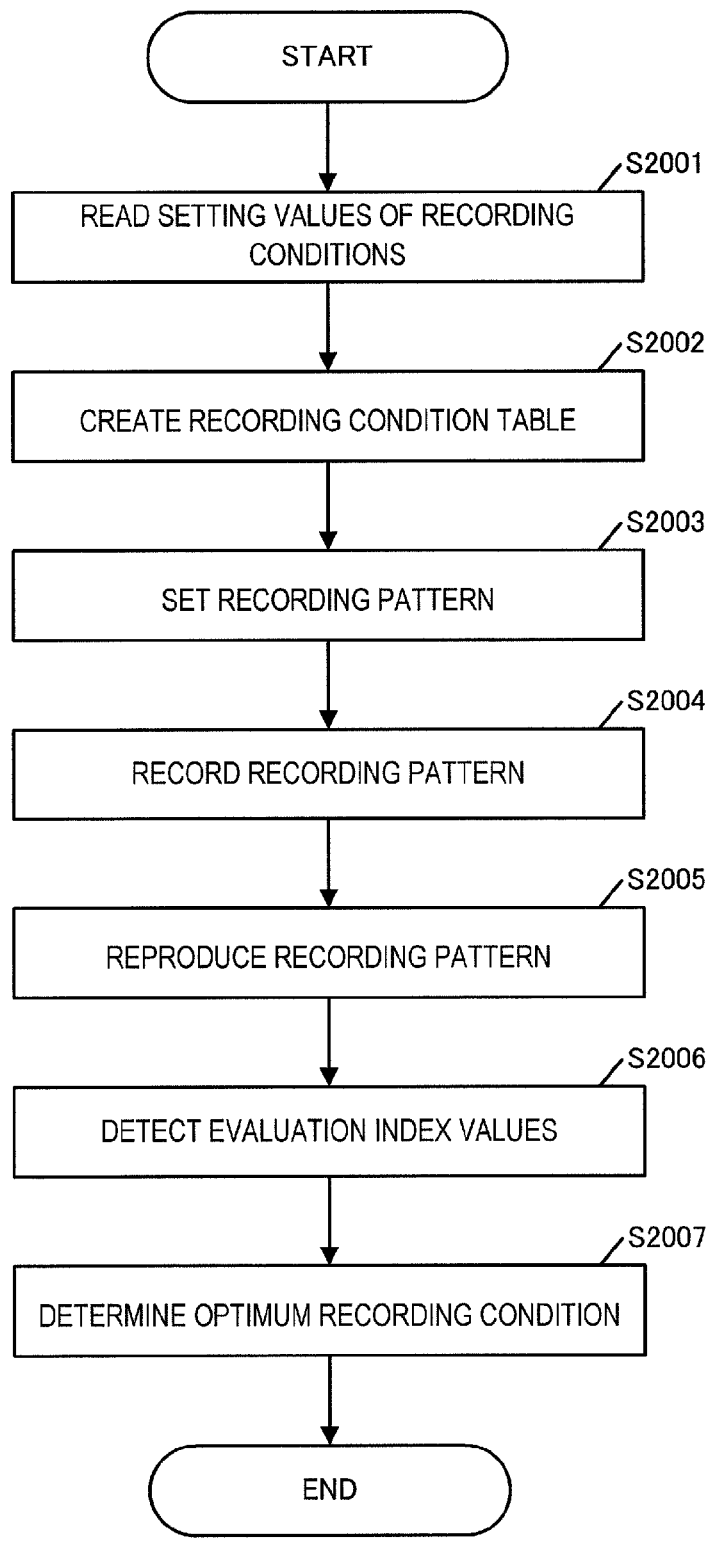
FIG. 20 is a flowchart showing an adjustment procedure of a recording pulse condition according to the embodiment of the present invention.

FIG. 20 is a flowchart showing an adjustment procedure on a recording pulse condition performed by the information recording/reading apparatus 100 in this embodiment.

Hereinafter, with reference to FIG. 20, the adjustment procedure on a recording pulse condition will be described for each step. The adjustment procedure on a recording pulse condition is executed on the information recording medium 1 by the information recording/reading apparatus 100.

In a first step (S2001), set values of the recording conditions are read.

The information recording/reading apparatus 100 reads information on the recording power and the recording pulse condition stored inside the information recording medium 1 or the information recording/reading apparatus 100 (for example, a memory) as a recording parameter of the initial recording condition.

Figure 2:
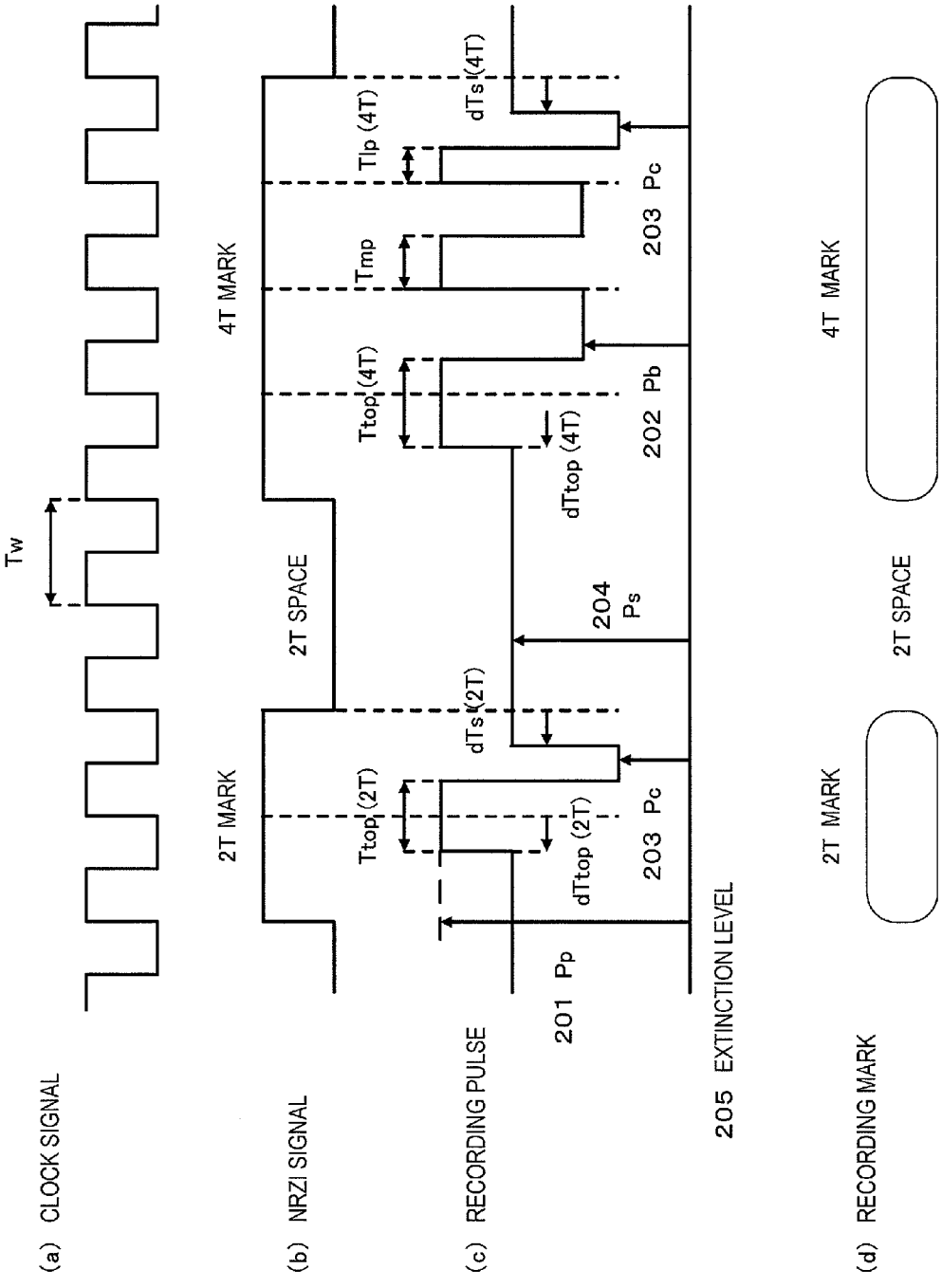
FIGS. 2(a) through (d) illustrate a recording pulse waveform and a recording power.

The "information stored inside the information recording medium 1" is a value of the recording condition specified in advance based on the result of evaluation performed on the recording characteristic of the medium by the manufacturer of the medium at the time of production thereof. An example of the information stored inside the information recording medium 1 is a value of the recording condition recorded in the past by the information recording/reading apparatus (for example, an optical disc drive) in an area of the information recording medium 1 for recording information inherent to the apparatus. The "information stored inside the information recording/reading apparatus 100" is a value of the recording condition specified in advance based on the result of evaluation performed on the recording characteristic of the apparatus by the manufacturer of the apparatus at the time of production thereof. Such information may be a value of the recording condition in history information which is stored by the information recording/reading apparatus itself regarding an information recording medium used in the past. The set value of the recording power and the recording pulse condition are the values on the recording power or the recording pulse described above with reference to FIG. 2.

In a second step (S2002), a recording condition table is generated.

The control section 15 generates a recording condition table used for recording a prescribed recording pattern under a plurality of recording conditions.

The recording condition table is a table used for changing the recording parameters.

For example, for performing length adjustment on the SM group, the control section 15 offsets the recording parameter for the leading edge (dips) in the range of −4 step to +4 step at an interval of 1 step in accordance with the recording condition table. Similarly for performing length adjustment on the MS group, the control section 15 offsets the recording parameters for the trailing edges (dTpe and dCp) in the range of −4 step to +4 step at an interval of 1 step in accordance with the recording condition table.

For example, for performing phase adjustment on the SM group, the control section 15 offsets the recording parameters for the leading and trailing edges in the range of −8 step to +8 step at an interval of 2 steps in accordance with the recording condition table. Similarly for performing phase adjustment on the MS group, the control section 15 offsets the recording parameters for the leading and trailing edges in the range of −8 step to +8 step at an interval of 2 steps in accordance with the recording condition table.

Between the SM group and the MS group, the offset amount and the offset interval of each recording parameter may be different. Between the length adjustment and the phase adjustment in the same group, the offset amount and the offset interval of each recording parameter may be different.

"1 step" is the unit obtained by, for example, dividing a period T of the recording clock by 32. When the period T is 132 MHz, 1 step is about 237 ps. 1 step may be set to a fixed value (for example, 250 ps).

In a third step (S2003), a recording pattern including a continuous sequence of a shortest mark and a shortest space is set.

The control section 15 specifies a recording pattern in the recording pattern generation section 11. The recording pattern may be generated for each recording operation. In order to shorten the time necessary for generating the recording pattern, it is preferable to store pre-generated recording patterns inside the information recording/reading apparatus.

The recording pattern is, for example, a random signal of the PLL(1,7) code. Alternatively, the recording pattern may be set in consideration of the frequency at which a 2T-continuous pattern appears. For example, the recording pattern may have 2Ts2Tm3Ts and 3Ts2Tm2Ts appearing at a higher frequency than in the random signal, such that many edges of the SM group and the MS group on which the recording adjustment is to be performed are detected.

The recording pattern generation section 11 generates an NRZI signal based on the specified recording pattern.

The recording compensation section 12 generates a recording pulse train of the laser light waveform based on the recording pulse shape of the recording parameter output from the control section 15 and the NRZI signal output from the recording pattern generation section 11.

The laser power setting section 14 sets recording powers including the peak power Pp, the bottom power Pb and the like in accordance with the initial recording condition of the control section 15.

In a fourth step (S2004), a recording operation of the recording pattern is performed on the information recording medium 1.

The control section 15 moves the optical head 2 to a recording area in order to adjust the recording parameters. The recording area is, for example, a recording area usable for adjusting the recording power and the recording pulse, which is provided in the innermost area of the information recording medium, and is called a "PCA (Power Calibration Area) in a DVD. In the case where, for example, the manufacturer evaluates the recording characteristic of the information recording medium or the information recording/reading apparatus on the production stage thereof, a user data area usable by the user to record user data may be used as the recording area.

Next, the laser driving section 13 controls the laser light emitting operation of the optical head 2 in accordance with the recording pulse train generated by the recording compensation section 12 and the recording power set by the laser power setting section 14, and thus records the recording pattern on a track (not shown) of the recording area of the information recording medium 1 with a prescribed recording length (for example, the length of the minimum recording unit, the length of the address unit, etc.).

At this point, the control section 15 refers to the recording condition table generated in step S2002 to control the laser driving section 13 such that the laser driving section 13 records the recording pattern with the recording condition being variously changed.

In a fifth step (S2005), a reproduction operation of the recording pattern recorded under the plurality of recording conditions is performed.

The information recording/reading apparatus 100 reproduces the track on which the recording pattern is recorded under the plurality of recording conditions.

The optical head 2 generates an analog reproduction signal representing the information read from the information recording medium 1. The analog reproduction signal is amplified by the preamplifier section 3 to be AC-coupled and then is input to the AGC section 4. The AGC section 4 adjusts the gain such that the output from the waveform equalization section 5 on a stage after the AGC section 4 has a constant amplitude. The analog reproduction signal output from the AGC section 4 is waveform-shaped by the waveform equalization section 5. The waveform-shaped analog reproduction signal is output to the A/D conversion section 6. The A/D conversion section 6 performs sampling of the analog reproduction signal in synchronization with the reproduction clock output from the PLL section 7. The PLL section 7 extracts the reproduction clock from the digital reproduction signal obtained by the sampling performed by the A/D conversion section 6.

The digital reproduction signal generated by the sampling performed by the A/D conversion section 6 is input to the PR equalization section 8. The PR equalization section 8 shapes the waveform of the digital reproduction signal. The maximum likelihood decoding section 9 performs maximum likelihood decoding on the waveform-shaped digital reproduction signal output from the PR equalization section 8 to generate a binary signal. The pattern shift detection section 10 receives the waveform-shaped digital reproduction signal output from the PR equalization section 8 and the binary signal output from the maximum likelihood decoding section 9. In addition, the pattern shift detection section 10 finds pattern shifts, which are each a shift between the reproduction signal and the PR equalization ideal value. The pattern shifts are output to the control section 15.

In a sixth step (S2006), evaluation index values for the plurality of recording conditions are detected.

The control section 15 receives the pattern shifts, in accordance with the detection patterns, output from the pattern shift detection section 10. In addition, the evaluation index calculation section 16 calculates an evaluation index value of the length error or the phase error based on the pattern shifts corresponding to the SM group or the MS group. The evaluation index calculation section 16 calculates the evaluation index value using pattern shifts corresponding to different Euclidean distance differences.

The evaluation index calculation section 16 calculates the length error of each of the SM group and the MS group for the length adjustment, and calculates the phase error of each of the SM group and the MS group for the phase adjustment.

In a seventh step (S2007), processing of determining the optimum recording condition is performed.

The control section 15 compares the evaluation index value for each of the plurality of recording conditions detected in step S2006 against the target index value stored inside the control section 15, and selects the recording condition corresponding to the evaluation index value closest to the target index value. As a result, the recording condition for each of the SM group and the MS group is determined.

In addition, the control section 15 determines the recording condition for the SMS group based on the recording adjustment results on the SM group and the MS group.

For example, for determining the recording pulse condition for the SMS group based on the set values of the recording pulse conditions (dTtop, etc.), which are the recording adjustment results, the control section 15 sets an average value of the set values of the recording pulse conditions for the SM group and the MS group as the recording pulse condition for the SMS group, and thus determines the recording condition for the SMS group.

For determining the recording pulse condition for the SMS group based on the change amounts of the recording parameters (dTps, etc.), which are the recording adjustment results, the control section 15 adds an average value of the change amounts of the recording parameters for the SM group and the MS group to the initial recording condition as the change amount of the recording parameter for the SMS group, and thus determines the recording condition for the SMS group.

When the average value is an intermediate value with respect to the set value unit, the intermediate value is rounded up or down.

In this manner, the recording pulse condition is adjusted by the information recording/reading apparatus 100, and the length adjustment or the phase adjustment of the 2T-continuous patterns is performed by the control section 15. Regarding the adjustment on the recording pulse conditions, it is not necessary to perform the recording adjustment for the SM group and the MS group at the same time. The recording adjustment settings may be made separately for the SM group and for the MS group.

FIG. 21 shows a procedure of the length adjustment and the phase adjustment performed by the information recording/reading apparatus 100 in this embodiment.

In a first step (S2101), the length adjustment on a 2T-continuous pattern is performed.

In a second step (S2102), the phase adjustment on the 2T-continuous pattern is performed.

On the 2T-continuous patterns, namely, the recording pulse conditions of the SMS group, the SM group and the MS group, the length adjustment and the phase adjustment are performed in accordance with the flow of adjustment on the recording pulse conditions shown in FIG. 20.

As described above, at high density recording exceeding the optical resolution, thermal interference caused by the recording mark itself is significant, especially when the recording mark is the shortest mark. The influence of the thermal interference is more significant on the length change of the recording mark than on the position change thereof. The position change of the recording mark is caused by the change of the recording pulse in the state where the recording pulse width is kept constant. Therefore, the amount of heat for forming the recording mark is constant, and so the influence of the thermal interference by the recording mark itself is insignificant. For this reason, it is desirable that the length adjustment, which is more influenced by the thermal interference of the recording mark itself, is first performed and then the phase adjustment is performed.

Owing to this, the influence of the thermal interference of the recording mark itself, which cannot be removed by the conventional recording adjustment method of changing either the leading edge or the trailing edge, can be suppressed.

As described above, the recording operation in this embodiment is performed in accordance with the pattern table which is provided in consideration of the high density recording exceeding the optical resolution. Therefore, the recording adjustment is not on an edge shift of one space and one recording mark as in the conventional art, but is on the recording condition in consideration of the previous and subsequent spaces. Furthermore, the recording adjustment is performed for each of groups, classified in the pattern table, respectively corresponding to the 2T-continuous patterns which are likely to cause an error detected by the PRML method.

Therefore, the recording condition of the high density recording exceeding the optical resolution can be adjusted to be a recording condition under which the error rate of the recording information is decreased. Thus, a more stable recording/reading system can be provided.

An embodiment according to the present invention has been described with reference to the figures.

In this embodiment, there is no specific limitation on the method of setting coefficients in the calculation expressions for finding the length error and the phase error. Examples of setting will be described below.

The recording and reproduction operation described above is performed with a recording capacity of about 33.4 GB in a BD system in which the information recording medium is a BD-RE disc, the numerical aperture NA of the objective lens of the optical head in the information recording/reading apparatus is 0.85, the wavelength of the laser light is 405 nm, the PRML method is PR(1,2,2,2,1)ML method, and the recording code is the RLL(1,7) code. In this case, the length of each of a mark and a space of the shortest length, i.e., the length of each of a 2T mark and a 2T space, is about 111.7 nm. As described above, at the recording density exceeding the optical resolution, the length of each of the shortest mark and the shortest space, i.e., the length of each of the 2T mark and the 2T space, is 119.1 nm or shorter. Thus, the recording condition described above exceeds the optical resolution.

FIG. 22($a$) shows change amounts of the pattern shifts with respect to the change of the recording pulse of the SM pattern. FIG. 22($b$) shows change amounts of the pattern shifts with respect to the change of the recording pulse of the MS pattern.

The change amount of each pattern shift is obtained when the recording pulse changes by 0.25 ns, and is a result of normalization performed using the Euclidean distance difference (unit: %).

In an example of the change of the recording pulse with respect to the length change of the SM pattern, dTps is changed forward in FIG. 19($d$). In this case, the length of the 2T mark of the SM pattern is increased.

In an example of the change of the recording pulse with respect to the phase change of the SM pattern, dTps, dTpe and dCp are changed forward at the same time in FIG. 19($d$). In this case, the 2T mark of the SM pattern is shifted forward.

In an example of the change of the recording pulse with respect to the length change of the MS pattern, dTpe and dCp are changed rearward at the same time in FIG. 19($f$). In this case, the length of the 2T mark of the MS pattern is increased.

In an example of the change of the recording pulse with respect to the phase change of the MS pattern, dTps, dTpe and dCp are changed forward at the same time in FIG. 19($f$). In this case, the 2T mark of the MS pattern is shifted forward.

Referring to FIG. 22, the change amount of each pattern shift caused when the length of the SM pattern is changed is assigned to expression 4. The results are: (PXM2S−P2MXS)> 0, (ASM_R−ASM_L)>0, and (BSM_R−BSM_L)< 0. Where the components of expression 4 are provided with the same weighting, coefficients a1, b1 and c1 are a1=1, b1=1, and c1=−1.

The change amount of each pattern shift caused when the phase of the SM pattern is changed is assigned to expression 5. The results are: (PXM2S+P2MXS)>0, (ASM_R−ASM_L)> 0, and (BSM_R−BSM_L)>0. Where the components of expression 5 are provided with the same weighting, coefficients a2, b2 and c2 are a2=1, b2=1, and c2=1.

Comparing the coefficients for the same component, the sign of c1 and c2 in the third terms of expressions 4 and 5 is inverted to each other.

Similarly, referring to FIG. 22, the change amount of each pattern shift caused when the length of the MS pattern is changed is assigned to expression 6. The results are: (P2SXM−PXS2M)>0, (AMS_R−AMS_L)<0, and (BMS_R−BMS_L)>0. Where the components of expression 6 are provided with the same weighting, coefficients a3, b3 and c3 are a3=1, b3=−1, and c3=1.

The change amount of each pattern shift caused when the phase of the MS pattern is changed is assigned to expression 7. The results are: (P2SXM+PXS2M)<0, (AMS_R−AMS_L)> 0, and (BMS_R−BMS_L)>0. Where the components of expression 7 are provided with the same weighting, coefficients a4, b4 and c4 are a4=−1, b4=1, and c4=1.

Comparing the coefficients for the same component, the sign of a3 and a4 in the first terms of expressions 6 and 7, and the sign of b3 and b4 in the second terms of expressions 6 and 7, are inverted to each other.

For changing the phase of the MS pattern, the parameters are shifted forward in the above. In the case where the parameters are shifted based on the rear side, which is the side of the 2T space, the sign of coefficients a4, b4 and c4 is inverted, resulting in a4=1, b4=−1, and c4=−1. Comparing the coefficients for the same component, the sign of c3 and c4 in the third terms of expressions 6 and 7 is inverted to each other.

Accordingly, in the length change and the phase change of the SM pattern and the MS pattern, when the recording pulse is changed with the side of the 2T space being the forward side, the sign of the coefficients in the third term is inverted in the expressions for finding the length error and the chase error. Namely, the length error and the chase error including a pattern shift difference can be calculated by inverting the sign of the pattern shift difference depending on the error pattern.

Comparing the coefficients of the SM pattern and the MS pattern, the sign of the coefficients in the second and third terms is inverted regarding both of the length change and the phase change. Namely, for calculating the length error or the phase error in each of classified error patterns which are different in the order of the shortest mark and space, the length error or the phase error in each error pattern can be calculated by inverting the sign of the pattern shift difference.

As described above, the recording adjustment on the SM pattern and the MS pattern can be performed in the BD system using the coefficients having the above relationships.

In summary, according to the present invention, information is decoded from a reproduction signal read from an information recording medium, and a length error and a phase error of a recording mark are detected based on a difference between squares of Euclidean distances between a plurality of error patterns corresponding to a correct pattern to be decoded and a reproduction signal. At this point, a first error pattern caused by a shift of a bit relating to a recording mark or a space of a shortest length, and a second error pattern caused by an edge shift of a recording mark, are used. In this case, the square of the Euclidean distance between the first error pattern and the correct pattern and the square of the Euclidean distance between the second error pattern and the correct pattern are different from each other. Further according to the present invention, for each of the plurality of error patterns, a pattern shift obtained by normalizing a difference between the square of the Euclidean distance between each error pattern and the correct pattern and the square of the Euclidean distance between the correct pattern and the reproduction signal, using the square of the Euclidean distance between the correct pattern and the error pattern, is detected. The length error and the phase error are calculated based on a sum of, or a difference between, a first pattern shift amount obtained by normalization performed using the first error pattern and a second pattern shift amount obtained by normalization performed using the second error pattern.

In this case, the first error pattern includes at least an error pattern in which a recording mark or a space of the shortest length is bit-shifted forward and an error pattern in which a recording mark or a space of the shortest length is bit-shifted rearward. Based on the first pattern shift amount, an average position of the pattern shift detected from the error pattern in which the recording mark or the space is bit-shifted forward and the pattern shift detected from the error pattern in which the recording mark or the space is bit-shifted rearward is detected. By finding the average position, amounts of the pattern shifts which occur forward and rearward by reproduction noise can be suppressed. Therefore, based on the first shift amount, edge detection can be performed with no influence of the reproduction noise.

As described above, according to the embodiment of the present invention, the length error and the phase error calculated using the first error pattern and the second error pattern having different squares of the Euclidean distances to the correct pattern can be detected property even if the reproduction noise is changed. Hence, the present invention is especially effective to high density recording exceeding the optical resolution which includes an error caused by a shift of a bit relating a recording mark or a space of a shortest length.

The above embodiment has been described with the information recording/reading apparatus including the reading section 101 in order to explain the recording/reading operation. Alternatively, the apparatus may be structured as an information recording apparatus including a recording control section 102 for performing only recording control and the recording section 103. In this case, it is not necessary to adjust recording conditions. Therefore, the present invention is applicable to a recording apparatus for performing only a recording operation on, for example, a read only disc or the like. The present invention is also applicable to an information recording apparatus which is capable of detecting a length error and a phase error with respect to an input signal.

In the pattern table in this embodiment, the same settings are made on 5T or longer recording marks and spaces. Alternatively, separate settings may be made on the recording marks and spaces of each length from 5T to the maximum length. In the pattern table, the same settings are made on the 3T or longer previous or subsequent spaces. Alternatively, separate settings may be made on the spaces of each length from 3T to the maximum length.

The recording conditions classified in the pattern table may be described inside the information recording medium 1. Owing to this, the control section 15 does not need to store the recording conditions in the pattern table for each type of information recording medium or each recording speed. This can reduce the circuit scale. In the case where the optimum recording condition for the information recording medium is described in accordance with the pattern table, the execution or the amount of time necessary for recording parameter adjustment can be reduced.

The information recording/reading apparatus 100 (FIG. 1) is usable as an information reading apparatus. In this case, the reading section 101 and the recording adjustment section 102 have the same structure as that in FIG. 1. The recording section 103 includes the optical head 2, the laser driving section 13, and the laser power setting section 14. The laser power setting section 14 sets a reproduction power. The laser driving section 13 controls the laser light emitting operation of the optical head 2 in accordance with the reproduction power which is set by the laser power setting section 14. Such an information reading apparatus performs reproduction from a rewritable disc or a read only disc having information recorded thereon, and calculates a signal index value, which represents a length error or a phase error. Owing to this, the information reading apparatus can evaluate an edge shift of the recording mark on the optical disc from which the information has been reproduced. Namely, the information reading apparatus is usable as a reading apparatus for inspecting the quality of a signal recorded by an information recording apparatus (for example, an apparatus which has produced read only discs) or for correcting a recording condition.

FIG. 23 is a schematic view of the information recording medium 1 in this embodiment. The information recording medium 1 shown in FIG. 23 is a BD, and includes a PIC zone (Permanent Information & Control Data Zone) 301 provided in the innermost area and a user data zone 302 provided outer thereto. In the PIC zone, a disc structure, information necessary for recording data on the disc or other information is recorded by modulating a track groove. As described above, the recording condition adjusted on the production stage of the information recording medium 1 is described in, for example, the PIC zone. In the user data zone 302, information is recorded by high density recording exceeding the optical resolution.

Figure 24:
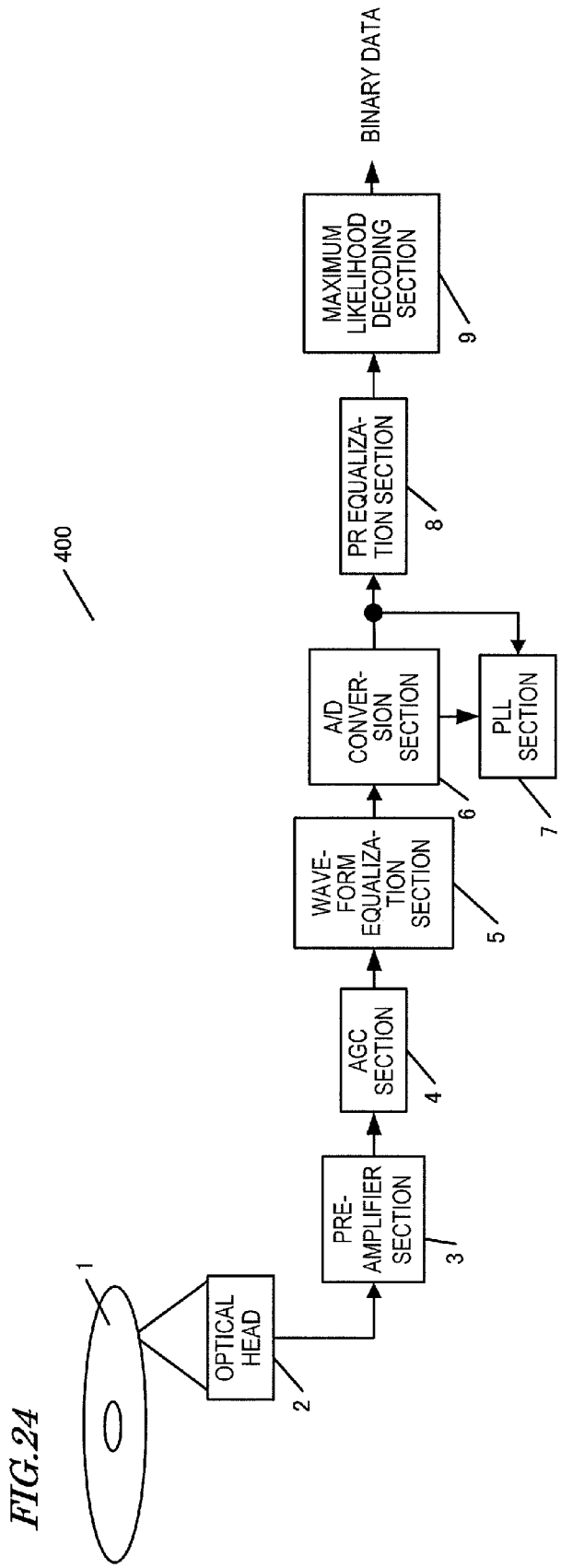
FIG. 24 shows an information reading apparatus according to the embodiment of the present invention.

FIG. 24 shows an information reading apparatus 400 in this embodiment for reading information from the information recording medium 1. Elements common to those in the information recording/reading apparatus 100 shown in FIG. 1 is represented by identical reference numerals thereto. The information reading apparatus 400 includes an optical head 2, a preamplifier section 3, an AGC section 4, a waveform equalization section 5, an A/D conversion section 6, a PLL section 7, a PR equalization section 8, and a maximum likelihood decoding section 9. The information reading apparatus 400 irradiates the user data zone 302 of the information recording medium 1 with laser light to demodulate recording information from a reproduction signal read from the information recording medium 1.

In this embodiment, the target index value may be set for each of various types of information recording mediums provided by various manufacturers, for each recording speed, or for each group classified in the pattern table. The target index value is stored on, for example, the production stage of the information recording/reading apparatus. By additionally storing target index values corresponding to newly developed information recording mediums, the apparatus is made compatible to such new information recording mediums. Therefore, it is desirable that the target index value is stored on a rewritable memory. The target index value of a new information recording medium can be determined by reading a recording mark formed with the optimum recording parameter by the information recording/reading apparatus 100.

In this embodiment, errors corresponding to Tables and 3 showing patterns by which the Euclidean distance difference is 12 are described. This embodiment is not limited to this. This embodiment is also applicable to, for example, 4-bit errors which correspond to a Euclidean distance difference of 12 and are caused by a shift of 1 bit of a continuous sequence of three 2T mark(s)space(s).

In this embodiment, maximum likelihood decoding performed using a state transition rule defined by a code having a shortest length of 2T and the equalization method PR(1,2,2,2,1) is described. The present invention is not limited to this.

The present invention is also applicable to, for example, a case where a code having a shortest mark length of 2T or 3T and the equalization method PR(C0, C1, C0) are used, a case where a code having a shortest mark length of 2T or 3T and the equalization method PR(C0, C1, C1, C0) are used, or to a case where a code having a shortest mark length of 3T and the equalization method PR(C0, C1, C2, C1, C0) are used. C0, C1 and C2 may be each any positive numeral. The signal processing of the reading system may be performed using the PR(2,3,3,3,2)ML method instead of the PR(1,2,2,2,1)ML method.

In this embodiment, in the pattern table, recording conditions for the shortest mark are set separately for the previous space and for the subsequent space, but the present invention is not limited to this. The present invention is applicable to, for example, a case where recording conditions for the second shortest mark, instead of the shortest mark, are set separately for the previous space and for the subsequent space.

The information recording medium in this embodiment is not limited to an optical disc such as a CD, a DVD, a BD or the like. This embodiment is applicable to a magneto-optic disc such as an MO (Magneto-Optical Disc) or an information recording medium on which information is recorded while changing the length or phase of the information (recording mark and space in this embodiment) formed in accordance with a polarity interval, which is a length of a continuous sequence of recording codes (0 or 1) of a digital signal.

A part of the information recording/reading apparatus according to the present invention may be produced as a recording condition adjustment apparatus for adjusting the shapes of recording pulses for recording information on an information recording medium, in the form of a one-chip LSI (semiconductor integrated circuit) or in the form of a device having a part of the function thereof. In the case where a part of the information recording/reading apparatus is produced as a one-chip LSI, the signal processing time for adjusting the recording parameters can be significantly shortened. Each part of the information recording/reading apparatus may be independently produced as an LSI.

Industrial Applicability

The present invention is applicable to an information recording/reading apparatus, for example, a DVD drive, a DVD recorder, a BD recorder or any other apparatus, for performing recording/reading on/from any of various information recording mediums usable for recording a data signal using laser light, an electromagnetic force or the like, for example, a DVD-RAM, a BD-RE, or any other information recording medium.

REFERENCE SIGNS LIST

1 Information recording medium
2 Optical head
3 Preamplifier section
4 AGC section
5 Waveform equalization section
6 A/D conversion section
7 PLL section
8 PR equalization section
9 Maximum likelihood decoding section
10 Pattern shift detection section
11 Recording pattern generation section
12 Recording compensation section
13 Laser driving section
14 Laser power setting section
15 Control section
16 Evaluation index calculation section
100 Information recording/reading apparatus
101 Reading section
102 Recording adjustment section
103 Recording section
201 Peak power
202 Bottom power
203 Cooling power
204 Space power
205 Extinction level

The invention claimed is:

1. An information reading method, comprising:
a reading step of decoding information from a reproduction signal read from an information recording medium; and
a detection step of detecting a length error and a phase error of a recording mark based on a difference between squares of Euclidean distances between a plurality of error patterns corresponding to a correct pattern obtained by the decoding and the reproduction signal;
wherein:
the detection step includes the step of detecting a first error pattern and a second error pattern among the plurality of error patterns;
a square of a Euclidean distance between the first error pattern and the correct pattern and a square of a Euclidean distance between the second error pattern and the correct pattern are different from each other; and
the detection step further includes the steps of:
calculating a first pattern shift amount by normalizing a difference between the square of the Euclidean distance between the first error pattern and the reproduction signal and a square of a Euclidean distance between the correct pattern and the reproduction signal, using the square of the Euclidean distance between the correct pattern and the first error pattern, in accordance with a time relationship between the correct pattern and the first error pattern;
calculating a second pattern shift amount by normalizing a difference between the square of the Euclidean distance between the second error pattern and the reproduction signal and the square of the Euclidean distance between the correct pattern and the reproduction signal, using the square of the Euclidean distance between the correct pattern and the second error pattern, in accordance with a time relationship between the correct pattern and the second error pattern; and
calculating the length error and the phase error by a sum of, or a difference between, the first pattern shift amount and the second pattern shift amount.

2. The information reading method of claim 1, wherein:
the number of error bits in the first error pattern is identical;
the number of error bits in the second error pattern is identical; and
the number of error bits in the first error pattern and the number of error bits in the second error pattern are different from each other.

3. The information reading method of claim 2, wherein:
the first error pattern includes:
an error pattern in which a recording mark or a space of a shortest run length in the information is shifted forward by 1 bit; and
an error pattern in which the recording mark or the space of the shortest run length in the information is shifted rearward by 1 bit; and the second error pattern is an error pattern caused by an edge shift of the recording mark of the shortest run length in the information.

4. The information reading method of claim 3, wherein where λ is the wavelength of laser light used for reading the information and NA is the numerical aperture of an objective lens, a length of the recording mark and the space of the shortest run length is equal to or less than λ/(4×NA).

5. The information reading method of claim 4, wherein the wavelength λ of the laser light is 400 nm to 410 nm, and the numerical aperture NA of the objective lens is 0.84 to 0.86.

6. The information reading method of claim 5, wherein the length error and the phase error are respectively calculated in two groups between which the order of the recording mark and the space of the shortest run length is inverted to each other.

7. An information reading method for reading information from an information recording medium on which information using RLL(1,7) codes having a shortest run length of 2T is formed as recording marks and spaces having a plurality of lengths, the method comprising:
 a reading step of decoding the information from a reproduction signal read from the information recording medium using a PRML method, which is PR(1,2,2,2,1) ML; and
 a detection step of detecting a length error and a phase error of a recording mark based on a difference between squares of Euclidean distances between a plurality of error patterns corresponding to a correct pattern identifiable by the PRML method and the reproduction signal;
 wherein:
 the detection step includes the step of detecting a first error pattern and a second error pattern among the plurality of error patterns;
 a square of a Euclidean distance between the first error pattern and the correct pattern and a square of a Euclidean distance between the second error pattern and the correct pattern are different from each other; and
 in the case where the correct pattern has a bit sequence of "1110011000" and the first error pattern includes "1100111000" and "1110001100" and in the case where the correct pattern has a bit sequence of "0001100111" and the first error pattern includes "0011000111" and "0001110011", the detection step further includes the steps of:
  calculating a first pattern shift amount by normalizing a difference between the square of the Euclidean distance between the first error pattern and the reproduction signal and a square of a Euclidean distance between the correct pattern and the reproduction signal, using the square of the Euclidean distance between the correct pattern and the first error pattern, in accordance with a time relationship between the correct pattern and the first error pattern;
  calculating a second pattern shift amount by normalizing a difference between the square of the Euclidean distance between the second error pattern and the reproduction signal and the square of the Euclidean distance between the correct pattern and the reproduction signal, using the square of the Euclidean distance between the correct pattern and the second error pattern, in accordance with a time relationship between the correct pattern and the second error pattern; and
  calculating the length error and the phase error by a sum of, or a difference between, the first pattern shift amount and the second pattern shift amount.

8. An information recording method, comprising:
 a reading step of decoding information from a reproduction signal read from an information recording medium;
 a detection step of detecting a length error and a phase error of a recording mark based on a difference between squares of Euclidean distances between a plurality of error patterns corresponding to a correct pattern decoded and the reproduction signal;
 an adjustment step of adjusting a recording condition for recording information on the information recording medium based on the length error and the phase error; and
 a recording step of recording the information on the information recording medium based on the recording condition;
 wherein:
 the detection step includes the step of detecting a first error pattern and a second error pattern among the plurality of error patterns;
 a square of a Euclidean distance between the first error pattern and the correct pattern and a square of a Euclidean distance between the second error pattern and the correct pattern are different from each other; and
 the detection step further includes the steps of:
  calculating a first pattern shift amount by normalizing a difference between the square of the Euclidean distance between the first error pattern and the reproduction signal and a square of a Euclidean distance between the correct pattern and the reproduction signal, using the square of the Euclidean distance between the correct pattern and the first error pattern, in accordance with a time relationship between the correct pattern and the first error pattern;
  calculating a second pattern shift amount by normalizing a difference between the square of the Euclidean distance between the second error pattern and the reproduction signal and the square of the Euclidean distance between the correct pattern and the reproduction signal, using the square of the Euclidean distance between the correct pattern and the second error pattern, in accordance with a time relationship between the correct pattern and the second error pattern; and
  calculating the length error and the phase error by a sum of, or a difference between, the first pattern shift amount and the second pattern shift amount.

9. An information recording medium having a track, wherein:
 information is recorded on the track, and information is decoded from a reproduction signal obtained by reading the track;
 a plurality of error patterns corresponding to a correct pattern to be decoded are detected;
 the first error pattern and the second error pattern are detected among the plurality of error patterns;
 a square of a Euclidean distance between the first error pattern and the correct pattern and a square of a Euclidean distance between the second error pattern and the correct pattern are different from each other; and
 a first pattern shift amount is calculated by normalizing a difference between a square of a Euclidean distance between the first error pattern and the reproduction signal and a square of a Euclidean distance between the correct pattern and the reproduction signal, using the square of the Euclidean distance between the correct pattern and the first error pattern, in accordance with a time relationship between the correct pattern and the first error pattern;

a second pattern shift amount is calculated by normalizing a difference between a square of a Euclidean distance between the second error pattern and the reproduction signal and the square of the Euclidean distance between the correct pattern and the reproduction signal, using the square of the Euclidean distance between the correct pattern and the second error pattern, in accordance with a time relationship between the correct pattern and the second error pattern;

the length error and the phase error are calculated by a sum of, or a difference between, the first pattern shift amount and the second pattern shift amount; and a recording condition adjusted based on the length error and the phase error is recorded.

10. An information reading apparatus for reading information from the information recording medium of claim 9, the apparatus comprising:

an optical head section for irradiating the information recording medium with laser light; and a reading section for decoding information from a reproduction signal read from the information recording medium.

* * * * *